(12) United States Patent
Sooch et al.

(10) Patent No.: US 11,202,352 B2
(45) Date of Patent: *Dec. 14, 2021

(54) ILLUMINATION DEVICE FOR ADJUSTING COLOR TEMPERATURE BASED ON BRIGHTNESS AND TIME OF DAY

(71) Applicant: Lutron Technology Company LLC, Coopersburg, PA (US)

(72) Inventors: Nav Sooch, Austin, TX (US); Horace C. Ho, Austin, TX (US); Rebecca Frank, Austin, TX (US); Jason E. Lewis, Driftwood, TX (US); Ryan Matthew Bocock, Austin, TX (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,896

(22) Filed: Mar. 18, 2019

(65) Prior Publication Data

US 2019/0215927 A1     Jul. 11, 2019

Related U.S. Application Data

(60) Continuation of application No. 15/264,775, filed on Sep. 14, 2016, now Pat. No. 10,237,945, and a
(Continued)

(51) Int. Cl.
*H05B 45/20*     (2020.01)
*H05B 47/115*    (2020.01)
*H05B 47/175*    (2020.01)

(52) U.S. Cl.
CPC .................... *H05B 45/20* (2020.01)

(58) Field of Classification Search
CPC ............ H05B 33/0872; H05B 33/0857; H05B 33/0863; H05B 37/0227; H05B 37/0272; H05B 37/0281; Y02B 20/42
See application file for complete search history.

(56) References Cited

U.S. PATENT DOCUMENTS

| 5,357,170 A  | 10/1994 | Luchaco et al. |
| 6,236,303 B1 | 5/2001  | Wagner et al. |

(Continued)

FOREIGN PATENT DOCUMENTS

| EP | 2635093 A2    | 9/2013 |
| WO | 2001099475 A1 | 12/2001 |
| WO | 2015188086 A1 | 12/2015 |

OTHER PUBLICATIONS

Co-pending U.S. Appl. No. 16/222,430, filed on Dec. 17, 2018.
(Continued)

*Primary Examiner* — Henry Luong
(74) *Attorney, Agent, or Firm* — Condo Roccia Koptiw LLP

(57) ABSTRACT

An illumination device, system and method are provided herein for emulating sunlight along a daytime or nighttime locus. Sunlight is emulated depending on the path length of the sun relative to a structure containing the illumination device and system. One or more illumination devices can be grouped together and perform the sunlight emulation along the locus by producing different color temperatures throughout the day by all illumination devices within that group producing the same color temperature changes throughout the day. Moreover, a particular advantage of the preferred embodiments is the ability to manually change at any time the emulated natural sunlight output from the one or more groups of illumination devices and advantageously change the color output more so at certain times than at other times by simply actuating a trigger on a dimmer associated with a virtual or physical keypad.

10 Claims, 10 Drawing Sheets

Related U.S. Application Data continuation of application No. 15/264,815, filed on Sep. 14, 2016, now Pat. No. 10,582,596, and a continuation of application No. 15/639,633, filed on Jun. 30, 2017, now Pat. No. 10,405,397, which is a division of application No. 15/264,863, filed on Sep. 14, 2016, now Pat. No. 9,795,000.

(56) References Cited

U.S. PATENT DOCUMENTS

| | | | |
|---|---|---|---|
| 7,663,325 | B2 | 2/2010 | McDonough et al. |
| 8,436,556 | B2 | 5/2013 | Eisele et al. |
| 9,237,623 | B1 | 1/2016 | Lewis et al. |
| 9,392,660 | B2 | 7/2016 | Dias et al. |
| 9,392,663 | B2 | 7/2016 | Knapp et al. |
| 9,578,724 | B1 | 2/2017 | Knapp et al. |
| 9,655,214 | B1 | 5/2017 | Sooch |
| 9,655,215 | B1 | 5/2017 | Ho et al. |
| 9,674,917 | B1 | 6/2017 | Sooch et al. |
| 9,763,303 | B2 | 9/2017 | Steiner |
| 9,795,000 | B1 | 10/2017 | Sooch et al. |
| 9,860,965 | B2 | 1/2018 | Recker et al. |
| 9,930,742 | B1 | 3/2018 | Sooch et al. |
| 10,159,130 | B2 | 12/2018 | Sooch et al. |
| 10,237,945 | B2 | 3/2019 | Sooch et al. |
| 10,331,167 | B2 * | 6/2019 | Hunter .................. H05B 45/24 |
| 10,624,171 | B2 | 4/2020 | Sooch et al. |
| 2006/0002110 | A1 | 1/2006 | Dowling et al. |
| 2006/0076908 | A1 | 4/2006 | Morgan et al. |
| 2011/0084614 | A1 | 4/2011 | Eisele et al. |
| 2011/0175546 | A1 | 7/2011 | Ramer et al. |
| 2012/0038291 | A1 | 2/2012 | Hasnain |
| 2012/0080944 | A1 | 4/2012 | Recker et al. |
| 2012/0319597 | A1 | 12/2012 | Park et al. |
| 2013/0082612 | A1 | 4/2013 | Kim et al. |
| 2013/0141018 | A1 | 6/2013 | Kamii |
| 2013/0218240 | A1 | 8/2013 | Feng et al. |
| 2014/0052220 | A1 | 2/2014 | Pedersen |
| 2014/0062297 | A1 | 3/2014 | Bora et al. |
| 2014/0070707 | A1 | 3/2014 | Nagazoe |
| 2014/0191688 | A1 | 7/2014 | King |
| 2015/0035437 | A1 | 2/2015 | Panopoulos et al. |
| 2015/0062892 | A1 | 3/2015 | Krames et al. |
| 2015/0179031 | A1 | 6/2015 | Wallace |
| 2015/0237703 | A1 | 8/2015 | Patel |
| 2015/0301716 | A1 | 10/2015 | Madonna et al. |
| 2015/0327340 | A1 | 11/2015 | Siessegger et al. |
| 2015/0359061 | A1 | 12/2015 | Adler |
| 2015/0373796 | A1 | 12/2015 | Bahrehmand |
| 2015/0377699 | A1 | 12/2015 | Ho et al. |
| 2015/0382422 | A1 | 12/2015 | Ho et al. |
| 2016/0029464 | A1 | 1/2016 | Hughes et al. |
| 2016/0066383 | A1 | 3/2016 | Dias et al. |
| 2016/0066384 | A1 | 3/2016 | Dias et al. |
| 2016/0074620 | A1 | 3/2016 | Naohiro et al. |
| 2016/0286616 | A1 * | 9/2016 | van de Ven .......... H05B 47/105 |
| 2016/0295658 | A1 | 10/2016 | Chraibi et al. |
| 2016/0366746 | A1 * | 12/2016 | van de Ven ............... F21V 7/00 |
| 2017/0098354 | A1 | 4/2017 | Loeb et al. |
| 2018/0075714 | A1 | 3/2018 | Sooch et al. |
| 2018/0077771 | A1 | 3/2018 | Sooch et al. |
| 2018/0077783 | A1 | 3/2018 | Sooch et al. |
| 2018/0177016 | A1 | 6/2018 | Sooch et al. |
| 2019/0124743 | A1 | 4/2019 | Sooch et al. |

OTHER PUBLICATIONS

Lutron, "Wired SeeTouch QS Wallstation: Advanced Programming Mode", Lutron Electronics Co., Inc., Application Note #428, Revision A, Apr. 2012, pp. 1-18.

Office Action, Canadian Patent Application CA 3036805 A, dated May 25, 2021, 5 pages.

* cited by examiner

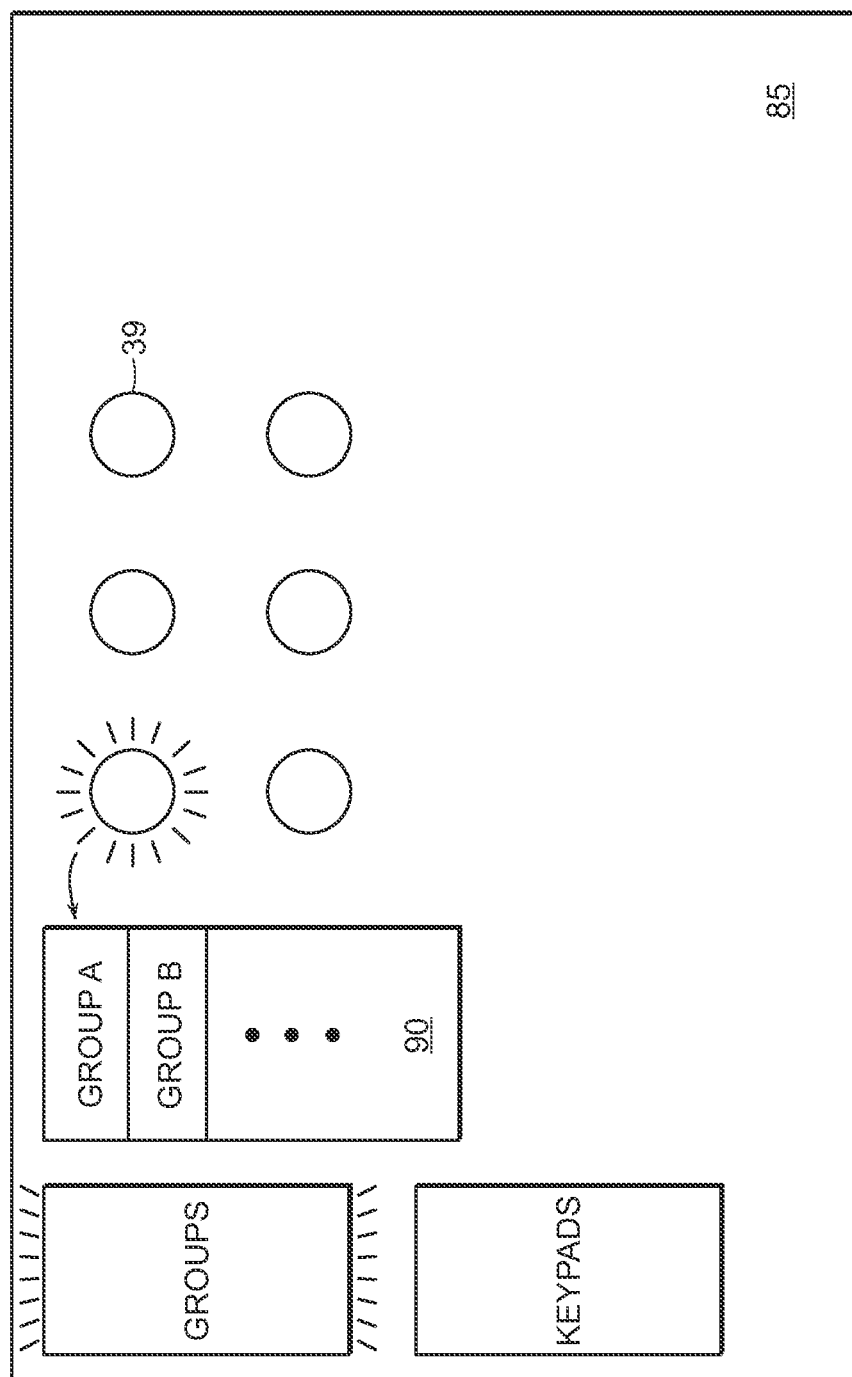

ILLUMINATION DEVICE FOR ADJUSTING COLOR TEMPERATURE BASED ON BRIGHTNESS AND TIME OF DAY

RELATED APPLICATIONS

This application is a continuation of U.S. patent application Ser. No. 15/264,775, filed Sep. 14, 2016, now U.S. Pat. No. 10,237,945, issued Mar. 19, 2019, is a continuation of U.S. patent application Ser. No. 15/264,815, filed Sep. 14, 2016, and is a continuation of U.S. patent application Ser. No. 15/639,633, filed Jun. 30, 2017, the entire disclosures of which are hereby incorporated by reference herein in their entireties. U.S. patent application Ser. No. 15/639,633 is a divisional of U.S. patent application Ser. No. 15/264,863, filed Sep. 14, 2016, now U.S. Pat. No. 9,795,000, issued Oct. 17, 2017.

U.S. patent application Ser. No. 15/264,775 is related to applications filed concurrently therewith under U.S. patent application Ser. No. 15/264,815, entitled "Illumination Device, System and Method For Manually Adjusting Automated Fading Of Color Temperature Changes To Emulate Exterior Daylight", and U.S. patent application Ser. No. 15/264,863 entitled "Illumination Device, System and Method For Manually Adjusting Automated Changes In Exterior Daylight Among Select Groups Of Illumination Devices Placed In Various Rooms Of A Structure."

BACKGROUND OF THE INVENTION

1. Field of the Invention

This invention relates to illumination devices comprising light emitting diodes (LEDs) whose color temperature and/or brightness automatically changes throughout the daytime or nighttime and, when lighting changes are manually applied, the color temperature can advantageously change based on time of day.

2. Description of the Relevant Art

The following descriptions and examples are provided as background only and are intended to reveal information that is believed to be of possible relevance to the present invention. No admission is necessarily intended, or should be construed, that any of the following information constitutes prior art impacting the patentable character of the subject matter claimed herein.

Illumination devices, sometimes referred to as lighting fixtures, luminaires or lamps include incandescent illumination devices, fluorescent illumination devices and the increasingly popular light emitting diode (LED) illumination devices. LEDs provide a number of advantages over traditional illumination devices, such as incandescent and fluorescent lighting fixtures. Primarily, LED illumination devices have lower power consumption, longer lifetime, are constructed of minimal hazardous materials, and can be color tuned for different applications. For example, LED illumination devices provide an opportunity to adjust the chromaticity (e.g., from white, to blue, to green, etc.) or the color temperature (e.g., from "warm white" to "cool white") to produce different lighting effects.

An illumination device can include a multi-color LED illumination device, which combine a number of differently colored emission LEDs into a single package. An example of a multi-color LED illumination device is one in which two or more different chromaticity of LEDs are combined within the same package to produce white or near-white light. There are many different types of white light illumination devices on the market, some of which combine red, green and blue (RGB) LEDs, red, green, blue and yellow (RGBY) LEDs, phosphor-converted white and red (WR) LEDs, RGBW LEDs, etc. By combining different chromaticity colors of LEDs within the same package, and driving the differently colored LEDs coated with or made of different semiconductor material, and with different drive currents, these illumination devices can mix their chromaticity output and thereby generate white or near-white light within a wide gamut of color temperatures or correlated color temperatures (CCTs) ranging from "warm white" (e.g., roughly 2600K-3700K), to "neutral white" (e.g., 3700K-5000K) to "cool white" (e.g., 5000K-8300K). Some multi-colored LED illumination devices also enable the brightness and/or color of the illumination to be changed to a particular set point. These tunable illumination devices should all produce the same color and color rendering index (CRI) when set to a particular brightness and chromaticity (or color set point) on a standardized chromaticity diagram.

A chromaticity diagram maps the gamut of colors the human eye can perceive in terms of chromaticity coordinates and spectral wavelengths. The spectral wavelengths of all saturated colors are distributed around the edge of an outlined space (called the "gamut" of human vision), which encompasses all of the hues perceived by the human eye. The curved edge of the gamut is called the spectral locus and corresponds to monochromatic light, with each point representing a pure hue of a single wavelength. The straight edge on the lower part of the gamut is called the line of purples. These colors, although they are on the border of the gamut, have no counterpart in monochromatic light. Less saturated colors appear in the interior of the figure, with white and near-white colors near the center.

In the 1931 CIE Chromaticity Diagram shown in FIG. 1, colors within the gamut 10 of human vision are mapped in terms of chromaticity coordinates (x, y). For example, a red (R) LED with a peak wavelength of 625 nm may have a chromaticity coordinate of (0.69, 0.31), a green (G) LED with a peak wavelength of 528 nm may have a chromaticity coordinate of (0.18, 0.73), and a blue (B) LED with a peak wavelength of 460 nm may have a chromaticity coordinate of (0.14, 0.04). The chromaticity coordinates (i.e., color points) that lie along the blackbody locus 12 obey Planck's equation, $E(\lambda)=A\lambda^{-5}/(e^{(B/T)}-1)$. Color points that lie on or near the blackbody locus provide a range of white or near-white light with color temperatures ranging between approximately 2500K and 10,000K. These color temperatures are typically achieved by mixing light from two or more differently colored LEDs. For example, light emitted from an RGB LEDs may be mixed to produce a substantially white light with a color temperature in the range of about 2500K to about 5000K. Although an illumination device is typically configured to produce a range of white or near-white color temperatures arranged along the blackbody curve (e.g., about 2500K to 5000K), some illumination devices may be configured to produce any color within the color gamut triangle formed by the individual LEDs (e.g., RGB).

At least part of the blackbody locus 12 is oftentimes referred to as the "daytime locus" corresponding to the Kelvin scale of color temperatures of daytime. For example, as shown in FIG. 2, several bounding boxes 14a, 14b, 14c and 14d are shown illustrative of color temperatures targeted to emulate daytime sunlight throughout the day. For example, 14a, 14b, 14c and 14d are chromaticity regions along the daytime locus of blackbody locus 12 (shown in dashed line) corresponding to target color temperatures in Kelvin of 6000K, 4000K, 3000K and 2300K, respectively. For example, the daytime locus color temperatures of 6000K can emulate blue sky noontime, 4000K can emulate a less blue mixture with some yellow overcast sky, 3000K can emulate a mixture of predominant yellow with some red morning sky, and 2300K can emulate predominant red with some yellow sunrise sky, similar to the differences between natural white, cool white and warm white color temperatures.

Some illumination devices allow color temperatures to be changed by altering the ratio of drive currents supplied to the individual LED chains. The drive currents, and specifically the ratio of drive currents, supplied to different colored LED chains can be changed by either adjusting the drive current levels (in current dimming) or the duty cycle (in PWM dimming) supplied to one or more of the emission LED chains. For example, an illumination device comprising RGB LED chains may be configured to produce a warm white color temperature by increasing the drive current supplied to the red LED chain and decreasing the drive currents supplied to the blue and/or green LED chain.

The color rendering index (CRI) is what defines the overall color or color appearance, and the CRI can be defined by the luminous flux (i.e., lumen output or brightness) and chromaticity. The brightness and chromaticity, or when mixed, the color temperature, can often form the target settings that change, due to changes in drive current, temperature and over time as the LEDs age. In some devices, the drive current supplied to one or more of the emission LEDs may be adjusted to change the brightness level and/or color temperature setting of the illumination device. For example, the drive currents supplied to all of the LED chains may be increased to increase the lumen or brightness output from the illumination device. In another example, as noted above, the color temperature setting of the illumination device may be changed by altering the ratio of drive currents supplied to the LED chains. As noted above, an illumination device comprising RGB LEDs may be configured to produce "warmer" white light by increasing the drive current supplied to the red LED chain and decreasing the drive currents supplied to the blue and/or green LED chain.

A need exists for an illumination device that can produce a different color or color appearance defined by brightness and chromaticity throughout the day, including evening and nighttime hours. It would be desirable to emulate a daytime locus, extending to nighttime, of one or more illumination devices configured in interior spaces of a structure. Periodic changes to the brightness as well as the chromaticity which forms the color temperature of one or more groups of illumination devices within one or more rooms is needed based on timing signals that are desirably sent periodically throughout the day. The desired timing signals can be sent from a timer remote from one or more groups of illumination devices in order to dynamically change the color temperatures so as to track, or correspond with, the emulated color temperatures external to the structure, and specific to outdoor sunlight or possible lack thereof.

There further remains a need for such an illumination system and method that need not rely upon sensor outputs in order to periodically change the color temperature output from a single illumination device or one or more groups of illumination devices. Dynamic changes in emulated color temperatures are selectively applied without use of sensor, but instead through use of time of day signals applied on a room-by-room basis. This proves advantageous and applicable to improved illumination systems that do not and cannot rely upon sensor outputs to periodically change color temperature output. Still further, it is desirable that whenever a task is needed that involves a change in color temperature output from one or more illumination devices, brightness can advantageously be changed manually to override the emulated sunlight, or lack thereof, output of color temperatures produced by the LEDs. Similar to the desired timer for producing times of day, output at regular periodic times, and corresponding color temperature changes in response to those times of day output, the desired illumination system can alter the dynamic and automatic emulated sunlight output by manually changing the brightness of all illumination devices within a group to produce differing changes in color temperature output depending upon the time of day in which the manual adjustment occurs. Advantageously, therefore, it is desirable to manually change the color temperatures relative to the time of day, and possibly more so during certain times of day than at other times. For example, when the emulated sunlight output mimics a higher color temperature near noon time, manual changes to brightness when tasking occurs will not substantially affect the high color temperature needed to maintain a more realistic noontime sunlight emulation. Yet, it is desirable to manually change the lower color temperature outputs during sunrise and sunset more so than at noontime, even though the brightness changes the same amount as noontime. It is therefore desirable to take advantage of the relationship between color temperature as a function of both the time of day and brightness so as to achieve task dimming (or reverse dimming) and resulting daytime emulation inside a structure that is more consistent with the actual sunlight occurring outside the structure. The emulation and manual override should be desirably applied to various groups of illumination devices within the structure. For example automatic emulation within a group of illumination devices within a bedroom should be different from that of a kitchen, and the manual override in each room should also be different due to different tasks needed to be performed in those rooms.

SUMMARY OF THE INVENTION

The following description of various embodiments of an illumination device, system and method for dynamically and automatically controlling changes in color temperature throughout the day or night, and manually overriding the automatically changing color temperature is provided. The manual override of task dimming can occur at any time of day and, preferably, the change in color temperature resulting from a manual change to the automatically changing color temperature (either increasing or decreasing the color temperature depending on the desired task) can effectively and advantageously maintains a truer emulation to the actual sunlight changes occurring outside as a function of the time of day or night.

According to one embodiment, an illumination device is provided comprising a plurality of LED chains, where each chain can be configured to produce illumination for the illumination device at a chromaticity consistent with a chromaticity setting. For example, each chain can be one of the primary chromaticity colors, such as red, green or blue. Moreover, a chain can also have a chromaticity consistent with a white chromaticity setting. The illumination device can also comprise a driver circuit coupled to the plurality of LED chains. The driver circuit is configured to generate a drive current to each of the chains and, based on the drive current supplied to those chains, the drive current can automatically change a color temperature output from the illumination device as a function of the time of day. For example, if the ratio of drive currents to the LED chains is modified at periodic times, that modification can occur automatically based on time outputs from, for example, a timer.

The automatic modification or change made to color temperature is one that does not involve actuation of a trigger, such as a slider, on a user interface of a remote controller. Unlike the manual override involving a change in intensity value sent from a remote controller to an interface or a dimmer to a controller, the automatic change to the color temperature occurs through parameters or set-points, pre-existing as stored content within memory of one or more illumination devices, and are invoked when the illumination device or devices receives time of day signals sent from the remote controller. A manual override must involve user actuation of a trigger on a user interface, whereas automatic changes to color temperature occur when the appropriate time of day signal is periodically and automatically sent without any user actuation upon a trigger.

The illumination device can further comprise a control module coupled to the driver circuit for sending a brightness value resulting from a task dimming function, for example. The brightness value is sent to each of the plurality of LED chains. The control module can comprise an interface coupled to receive an intensity value from, for example, a remote controller that is remotely placed relative to the illumination device, and specifically the control module that comprises a controller within the illumination device. A storage medium can include a non-linear first mapping of the intensity value received from the remote controller to the brightness value sent to the LED chains. The storage medium can also include a second mapping of the color temperature as a function of the time of day. The control module can further comprise the controller within the illumination device, the controller is coupled to receive a change in the intensity value from the interface and to fetch the first and second mappings from the storage medium to produce a change in the color temperature during a first time of day relative to a second time of day. According to one embodiment, the change in intensity value can decrease the color temperature during the daytime, as part of a dimming function. Depending on the task, however, the change in intensity value can increase the color temperature if reverse dimming is needed during, for example cloudy days when a higher temperature is needed for a reading task, for example. Also, intensity value can be increased if the current emulated output is nighttime and a user wishes to increase color temperature if he/she awakens from the bed, for example.

User movement of the trigger on the remote controller correspondingly changes the intensity value sent to the control module of each illumination device within a group of illumination devices within, for example, a room of a structure. As intensity is increased or decreased, task lighting can be manually controlled on a room-by-room basis. Moreover, the manual override applied on a room-by-room basis overrides the automatic changes in color temperature output also applied on a room-by-room basis. For example, actuation of a single trigger on a remote controller manually overrides an entire group of illumination device automatic changes in color temperature output using an improved discovery and acknowledge process for group casting hereof. The change in intensity can correspond to either a fixed or variable change in brightness applied to the LED chains. The fixed change in brightness can produce a greater change in color temperature output from the LED chains during the first time of day than during the second time of day, whereas a variable change in brightness can produce an equal change in color temperature output from the LED chains during the first time of day as that of the second time of day. According to the first embodiment, the color temperature can change more so during a first time of day than during a second time of day even though the brightness output from the LED chains stays constant throughout the day but has changed the same amount throughout the day or, according to the second embodiment, the color temperature can change the same amount during a first time of day as that of a second time of day even though the brightness output from the LED chains changes throughout the day but has changed the same amount.

Each of the plurality of LED chains can produce a spectral wavelength range that is different from the other of the LED chains. The driver current to each of the plurality of LED chains is applied as a ratio among the plurality of LED chains that automatically changes as a function of the time of day. It is not until the interface that receives an intensity value will the dynamic and automatic change functionality terminate. The interface that is coupled to receive the intensity value is one that receives during a lighting task, either dimming or reverse-dimming, for example, the manual override trigger from a user via a remote controller, to temporarily stop the dynamic and automatic changes in color temperatures as a function of the time of day. Alternatively, the dynamic and automatic changes in color temperatures can continue yet at a dimmed, or reverse-dimmed level. For example, when the next time of day signal from a timer invokes the next color temperature within the automatically changing color temperature show, the resulting color temperature can be greater than or less than what would normally be produced from the show. The manual override occurs when a user actuates a button or a slider on either the remote controller, or on an AC mains coupled dimmer that comprises a triac. Actuation of the trigger on the remote controller or triac, for example, can cause the button or slider position to be sent as an intensity value output from the remote controller or dimmer into the interface. The manual dimming override will cause a change in the brightness output from the plurality of LED chains. The manual dimming override and resulting change in brightness output will affect the LED output color temperatures differently depending upon the time of day in which the user actuates the trigger (e.g., button or slider).

If the color temperatures output from the LED chains dynamically and automatically change from, for example, 2300 Kelvin to 6000 Kelvin from sunrise to noon, for example, a manual task lighting override can occur by dimming the brightness output. The manual dimming of brightness in the morning will have a greater effect in lowering the color temperature than if the brightness dimming were to occur at, for example, noontime. Even though the degree of brightness dimming is the same, the lowering of color temperatures via task dimming is advantageously greater in the morning than during noon. This benefit is key in that a user within the structure would prefer to keep the higher color temperatures associated with noontime when he or she performs dimming for a task to be performed within that room of a structure. Nonetheless, a user would also prefer to achieve a greater reduction in color temperatures during, for example, the morning or evening hours since, during those hours, the color temperatures are already approaching the warm white color temperature spectrum and further dimming for a task would not deleteriously effect the users perception of the daylight emulation of the outdoor sunlight that is already at the lower color temperature locus. Historically, incandescent lights, which users are accustomed to are about 2700K and will drop to as low as 1500K when dimmed. Yet, high color temperature illumination devices, such as fluorescent or LED illumination devices do not significantly change color temperature when dimmed. Thus, the purpose hereof for LED dimming more in the morning and evenings is generally contrary to conventional LED lighting operation, yet is desirably achieved through the present manual override that will also maintain the conventionally desired less LED dimming when higher color temperatures are implemented.

According to one embodiment, therefore, it is preferred that the drive current to each of the plurality of LED chains automatically change as a function of the time of day to change the color temperature output from the LEDs so as to emulate the natural daytime light of the sun from sun up to sun down. According to a further embodiment, although the drive current to each of the plurality of LED chains automatically changes depending on a timer output that correlates to the position of the sun, the interface allows for either a wire or wireless communication from a timer within a remote controller that is remote from the illumination device. The remote controller that is remote from the illumination device also allows for a trigger for a user to actuate the trigger and change in the intensity value sent to the interface. The dimming or reverse-dimming trigger button slider can be configured on the remote controller or a triac-based dimmer remote from the illumination device and coupled to AC mains. That actuation not only changes the intensity value but correspondingly changes the brightness the same amount across all LEDs within one or more groups of illumination devices controlled by the trigger button. Yet, depending on the time of day, that change in brightness effectuated by the change in intensity value preferably has a greater effect when the LEDs would normally produce a lower color temperature than when they produce a higher color temperature. The benefit of the differing effects on color temperature, albeit the same change in brightness, is rooted in the human perception of emulated sunlight with, as stated above, the motivation for a user retaining a higher color temperature during peak sunlight hours than non-peak hours when a user would desire lower color temperatures during the override, manual dimming adjustment. That adjustment occurring whenever a user desires a dimming from a higher brightness to a lower brightness for performing certain tasks, yet maintaining a higher color temperature during peak sunlight hours and more substantially reducing the color temperatures during non-peak sunlight hours.

According to yet another embodiment, an illumination system is provided. The illumination system can comprise a plurality of LEDs configured to produce a plurality of color temperatures along the black body curve. A timer can also be provided for producing a plurality of times of day comprising a first time of day and a second time of day. A driver circuit can be coupled between the timer and the plurality of LEDs to receive the plurality of times of day and assign a drive current to the plurality of LEDs to produce a first color temperature during a first time of day and a second color temperature during a second time of day. The driver circuit automatically and dynamically produces the first color temperature and the second color temperature depending on when the timer produces the first time of day and the second time of day signals. However, the dynamic and automatic production of the first color temperature and second color temperature can be overridden by user actuation upon the trigger. A control module, and specifically an interface coupled to the control module, can receive the intensity value from the remote controller or dimmer and can send a corresponding brightness value to each of the plurality of LEDs. The brightness value is determined based on a non-linear first mapping of the intensity value to the brightness value. That non-linear first mapping can be stored in a storage medium, along with the second mapping of the color temperature as a function of the time of day. The storage medium, and specifically the first and second mappings are used by a controller. When the controller receives a change in the intensity value from the remote controller or dimmer, the controller fetches the first and second mappings from the storage medium and can produce a greater change in color temperature during the first time of day than during a second time of day, even though the brightness change resulting from the intensity value change is equal at both the first time of day and the second time of day.

The timer within, for example, the remote controller is preferably any module, circuit or system that has a clock. The clock preferably changes depending on position of the earth relative to the structure in which the timer is placed. The clock can be coupled to any synchronizing system, such as the crystal oscillator, or can receive periodic feeds from, for example, a satellite or over the Internet. Moreover, the clock can be preferably reset based on latitude and longitudinal coordinates of where the timer resides, as well as the particular time zone where the time resides. The timer produces the plurality of times of day at whatever interval is desired by the user, such as every minute, hour, or several hours. The plurality of times of day can therefore include daylight hours, beginning with, for example, 6 a.m., 7 a.m., 8 a.m., etc. if the regular timed intervals are set to be hourly. Alternatively, the timer produces time of day signals only on select times, such as sunrise, an hour after sunrise, an hour before sunset and/or sunset. In the latter example, the timer can produce in relatively short intervals (e.g., 10 minute intervals) over a fixed period of time (e.g., one hour) to cause a smoothing or "fading" effect each time the color temperature changes after sunrise and before sunset. To an observer, the color temperature would therefore change over a series of increasing or decreasing steps or linearly to increase or decrease the automatic color temperature changing show.

Like the timer that is preferably configured in the remote controller (i.e., physical keypad or portable computing device wired or wirelessly coupled to the group or groups of illumination devices), the AC-mains coupled dimmer is also configured remote from the illumination devices. The remote controller or dimmer manually changes the brightness value non-linearly and, depending upon the time of day, changes the color temperature differing amounts. A change of the intensity value output from the dimmer changes the brightness value equally among the plurality of LEDs yet, depending upon the time of day, changes the color temperature an equal or a differing amount. For example, the dimmer can comprise a trigger that, when actuated by the user, changes the color temperature more before 10 a.m. and after 4 p.m. than between 10 a.m. and 4 p.m. Also, when actuated by a user, movement of the trigger on the dimmer can register a change in the corresponding intensity value and, correspondingly, the brightness value. The color temperature preferably decreases more before 10 a.m. and after 4 p.m. than between 10 a.m. and 4 p.m. More preferably, color temperature decreases more an hour or two after sunrise and an hour or two before sunset than in the interim between sunrise and sunset. Those times are the local times relative to the geographic location of the structure containing the illumination devices.

According to yet another preferred embodiment, the plurality of LEDs can comprise a first plurality of LEDs. A second plurality of LEDs can be grouped with the first plurality of LEDs within a room of a structure. Accordingly, two or more LED-based illumination devices can be grouped together within a room of a structure. Those illumination devices can be a group of downlight PAR illumination devices mounted in a ceiling, and/or one or more A20 illumination devices or A19 illumination devices placed in lamps on nightstands, for example. Regardless of the type of illumination device, or its functionality, the illumination devices can be grouped with each other for control purposes. Typically, however, a group of the illumination devices are generally configured in geographic proximity to one another within one room of a structure, for example. Therefore, preferably according to some embodiments, the grouped plurality of illumination devices can be configured to produce the same color temperature among all of the illumination devices within that group. The color temperature among the grouped plurality of illumination devices is set by datasets stored as content within each of the grouped plurality of illumination devices. That content of datasets is configured and thereafter stored in the grouped illumination devices using the remote controller, for example. The remote controller can therefore not only discover all illumination devices within a structure and thereafter to group certain sets of illumination devices, but furthermore can assign content of datasets defining the chromaticity and brightness values of each illumination device with the group. Thereafter, when a time-based show is invoked by the timer, such as the automatic fading in of color temperature change, periodic times of day signals are sent to specific the grouped set of illumination devices. This causes all of the illumination devices within that group to undergo an automatic change in color temperature, and possibly also brightness output, throughout the day. Accordingly, the preferred method includes automatically changing the color temperature among the grouped plurality of illumination devices based on periodic, differing times of day signals sent from a timer remote from the grouped plurality of illumination devices to emulate changing natural light produced by the sun.

The preferred method of illumination further comprises manually dimming the brightness among the grouped plurality of illumination devices, resulting in the color temperature changing as a function of a current time of day signal sent from the timer. Specifically, if manual dimming occurs at a first time of day (i.e., at the current time of day signal for the first time of day), the color temperature may change more so than if the manual dimming occurred during a second time of day (i.e., at the current time of day signal for the second time of day). The manual dimming can maintain its override status of either terminating the automatically changing the color temperatures or an increase/decrease in the automatically changing color temperatures until a timeout timer elapses, a pre-determined time of day signal subsequently occurs, or possibly the next pre-determined time of day signal that subsequently occurs. The override status can be maintained indefinitely or, for a specific, pre-determined time amount. Moreover, the manual override, and specifically the change in intensity in dimming or reverse-dimming levels can gradually occur based on a plurality of steps, linearly, exponentially or any user-desired dimming or reverse dimming gradient over a fixed amount of time or a changing amount of time to gradually fade the automatically changing color temperature changes. The details of which, including the details of each of the above embodiments is further described herein below.

BRIEF DESCRIPTION OF THE DRAWINGS

Other objects and advantages of the invention will become apparent upon reading the following detailed description and upon reference to the accompanying drawings.

FIG. 9 is an exemplary GUI of a remote controller remote from the illumination devices, further illustrating the commissioning of physical illumination devices to groups possibly associated with a particular area or room within the structure;

Figure 1:
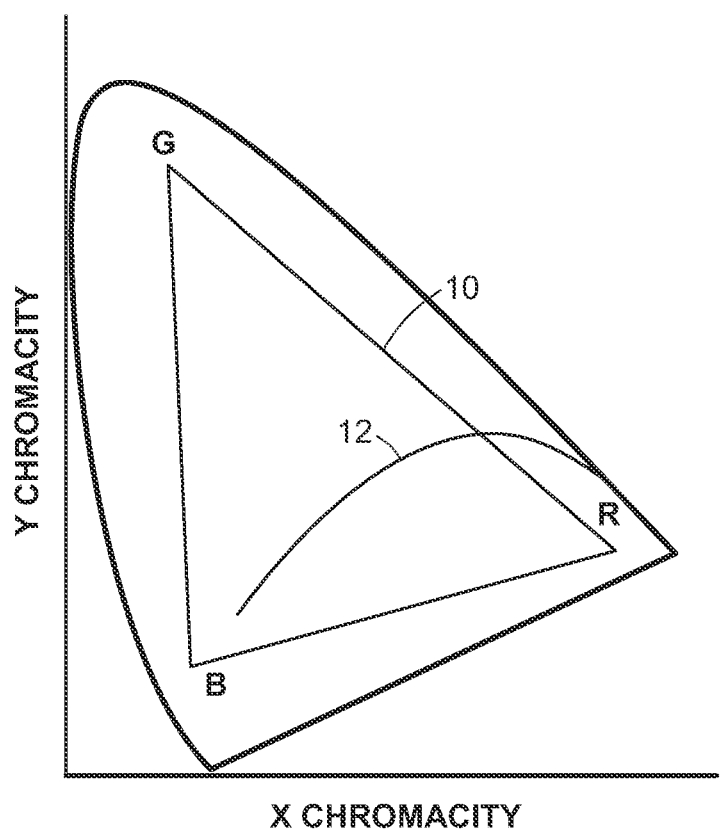
FIG. 1 is a graph of the 1931 CIE chromaticity diagram illustrating the blackbody curve of color perception or color temperatures, and the gamut of spectral wavelengths achievable by the illumination device comprising a plurality of LEDs of different color.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Among the various advantages of LED-based illumination devices is that LEDs offer distinct opportunities of being able to integrate artificial light with natural light, and to provide helpful and healthful lighting through dynamic lighting mechanisms. One particular niche of LED-based illumination devices is in the generation of artificial sunlight for a variety of reasons, especially for treating human ailments such as circadian rhythm disorders, seasonal affection disorders, shift work condition disorders, etc. The mechanism by which many conventional LED-based illumination devices replicate or "emulate" natural sunlight conditions is through use of sensors. The sensors can detect the sunlight conditions within a structure interior to that structure, and create artificial lighting from the illumination device that attempts to replicate the natural sunlight conditions or the emulated sunlight outside the structure. Unfortunately, sensors have limitations both in technology and the location where those sensors are located. The sensors therefore do not always accurately detect the exterior sunlight conditions, and the outdoor natural sunlight conditions sometimes cannot be properly emulated.

Accordingly, another more preferred alternative mechanism is to keep track of the time of day and send a plurality of times of day values from a timer to the LED-based illumination devices. Instead of using a sensor, with various flaws associated with that sensor, a timer is used and the emulated sunlight changes based on the times of day values or data sent from the timer. Use of timers and time of day values proves beneficial if the circadian show is to be tailored differently depending on the room in which sunlight is being emulated. Sensors cannot tailor emulation depending on the room, but instead sense and provide emulation consistently throughout the structure. Grouping of illumination devices on a room-by-room basis and controlling each room separately using different remote controllers and associated timers with different time of day values is therefore indigenous to timers and not sensors—an added benefit of not using sensors to control sunlight emulation. Of course, there are acceptable limits in using a timer versus a sensor. A timer changes the time of day value sent to the illumination device to update the illumination device output at periodic intervals throughout the day, without regard to whether the exterior conditions change outside the normal conditions that would occur during that time of day. For example, a timer in and of itself cannot detect cloudy exterior conditions, partly cloudy, overcast, foggy, or rainy conditions unless that timer were coupled to a sensor, and that sensor is preferably placed outside the structure and communicatively linked to the timer. Accordingly, the timer, and the communication of a plurality of times of day values, or data, sent from the timer of a remote controller illumination devices hereof is limited to the normal sunlight conditions expected during the various times of day. Use of a timer to emulate sunlight is bound to what is statistically normal sunlight conditions in some cases, but can be tailored depending on the room orientation to sunlight conditions. The benefit of selectively tailoring emulation depending on the group of illumination devices being controlled and the room orientation containing those devices outweighs any benefit of using sensors instead of timers. The individual control and tailoring on a room-by-room basis among groups of illumination devices proves to be a more superior control mechanism than sensors in the majority of days throughout the year. Any deviation from what the timer determines to be normal time of day sunlight emulations, and what is actually occurring outside is an acceptable deviation and does not distract from the sunlight emulation performed by the timer, and the benefits of tailoring the timer control among rooms within the structure. Use of only a timer without a sensor also proves adequate simply from the ease of use by which a timer operates rather than the inaccurate and oftentimes flawed sensor readings used to sense out-of-normal outside sunlight conditions. If the emulation show being produced, however, is not acceptable to a user, the user can always manually change the color temperature output at any time, as described below.

According to one embodiment, it is preferred that the sunlight conditions are emulated by use of a timer that manipulates and updates emulation from illumination devices based on calendar day and time of day, and that functionality is performed automatically and dynamically throughout the day. The automatic emulation occurs as a dynamically changing show that continues automatically without user intervention, and specifically continues to change the color temperature output in response to the illumination devices receiving the time of day signals sent from the timer. Automatic emulation and the automatically changing color temperature occurs without the user actuating a trigger, that functionally is reserved for the manual override and not the automatic show. Thereafter, depending on tasks needed by a user or if the user wishes to manually change the emulation to be more accurate as to what is occurring outside the structure, the user can manually change the color temperature output from an illumination device or a specific group of illumination devices either in a single step in response to user actuation or gradually in a smoothing plurality of steps or linearly as a function of time. The same reversion in a smoothing plurality of steps or linearly as a function of time can occur back to the automatically and dynamically changing emulation output after the task is completed, or after a user actuates a dimmer back to its previous trigger position or after the next time of day sunlight emulation change occurs, or the one thereafter.

Figure 2:
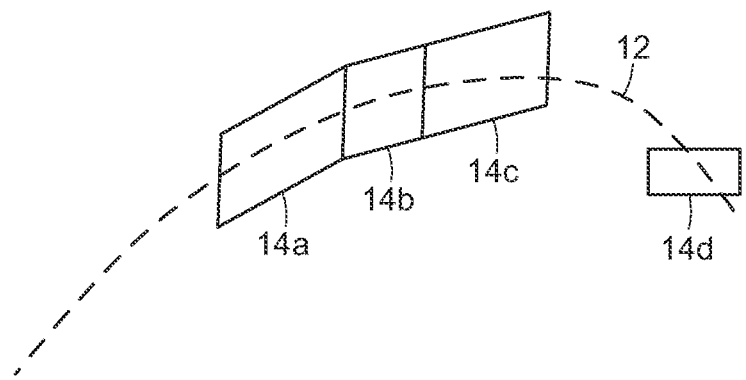
FIG. 2 is an exemplary color temperature space along the blackbody curve showing four boundaries of illumination from the plurality of LEDs.
Figure 3:
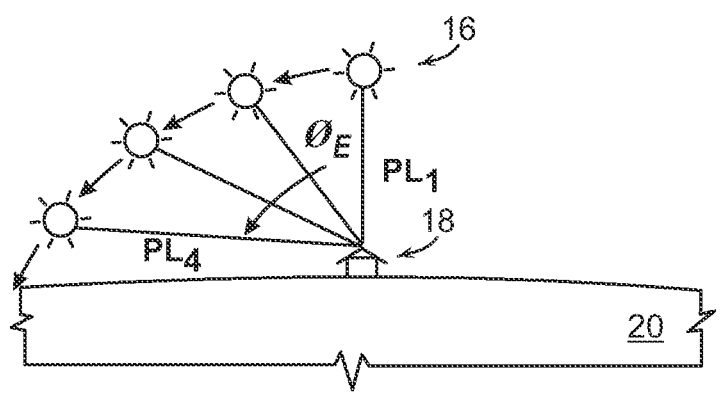
FIG. 3 depicts an angular relationship between a structure containing the illumination device and the sun, including changes in path length traveled by daytime sunlight throughout the day.
Figure 4:
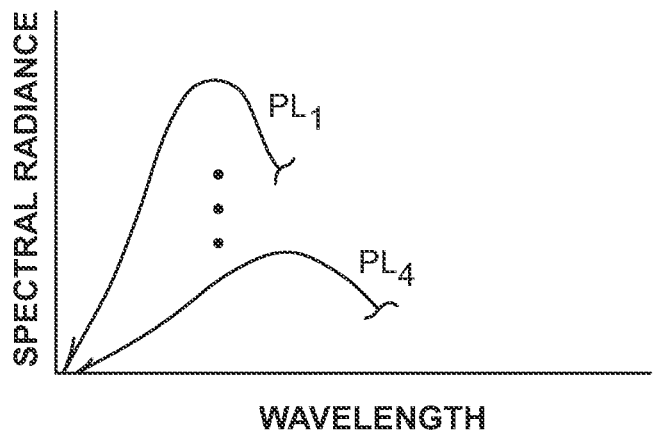
FIG. 4 is a graph of the relationship between dominant wavelengths throughout the daytime depending on the path length of the sun.

FIG. 3 illustrates in further detail the daytime locus and the spectral characteristics that resemble sunlight shown in FIGS. 1 and 2 resulting from the positional change of sun 16 relative to, for example, a structure 18 bearing one or more illumination devices. As shown in FIG. 3, the angular relationship between sun 16 and structure 18 changes throughout the day, where the angular relationship is often referred to as the zenith angle, $Ø_z$. As the sun 16 moves from an overhead position to a position nearly horizontal with the earth's surface 20, the path length (PL) increases from $PL_1$ to $PL_4$. Importantly, the spectral distribution of sunlight, specifically the spectral radiance of sunlight changes with PL. As shown in FIG. 4, shorter wavelengths can be more sensitive and produce greater spectral radiance at shorter PLs than do longer wavelengths. A combination of FIGS. 3 and 4 illustrate that as sun 16 is directly over structure 18, the shorter path length ($PL_1$) produces a greater amount of lower wavelength chromaticity spectrum, and as sun 16 approaches the horizon, the longer path length ($PL_4$) shows a predominance of longer wavelength spectral radiance. At $PL_1$, the natural sunlight condition is typically more of a cool white or natural sunlight color temperature having a preponderance of blue versus red and yellow. Conversely, as the path length increases to $PL_4$, the color temperature approaches more of the warm white associated with incandescent lighting or halogen lighting, with a preponderance of red and yellow versus blue. In order to emulate the changes in natural sunlight conditions within an artificial lighting system, such as the present illumination device, or devices, the illumination device must change its color temperature output throughout the day based on, for example, the changing path lengths ($PL_s$).

Figure 5:
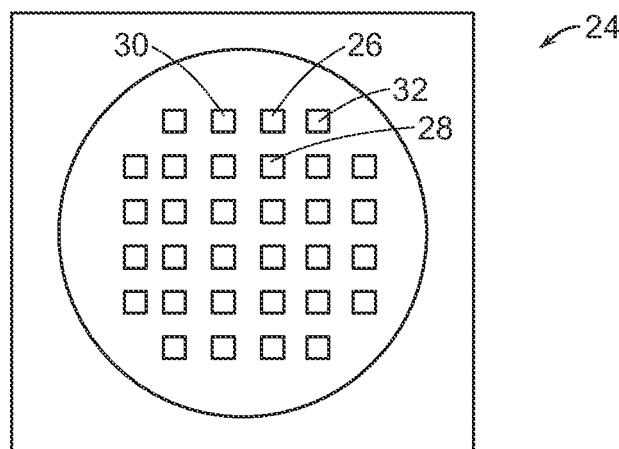
FIG. 5 depicts an array of different colored LEDs within an illumination device, where each of the different colored LEDs can be configured within a chain of similarly colored LEDs.

FIG. 5 partially illustrates a "white" LED illumination device 24. Illumination device formulates the white illumination by comprising, for example, a plurality of white LED semiconductor devices 26, a plurality of yellow-green semiconductor devices 28, a plurality of red LED semiconductor devices 30 and, if illumination device 24 is an RGB-based illumination device, a blue LED semiconductor device 32. The red, green, blue, and white semiconductor devices are each defined in a particular chromaticity region of the chromaticity space that includes a target chromaticity region of combined light emitted by the red, green, blue and white light emitters. The RGB system can form white light of a particular color temperature depending upon the mixing of the various red, green, blue chromaticity regions, for example. The red, green, blue, and white semiconductor devices are made from a variety of organic or inorganic semiconductor materials, each producing a different chromaticity or wavelength output. Certain of the red, green, blue or white semiconductor devices can be encapsulated with a coating to also produce the desired chromaticity wavelength output. For example, the white LED semiconductor device can comprise phosphor-coated blue emitting LED semiconductor device. Moreover, by independently attenuating each of the three, or four RGB or RGBW LED (or LED chains) the illumination device 24 is capable of producing a wide color gamut, with a color temperature along the black body curve and, according to the desired output along a daytime locus.

Figure 6:
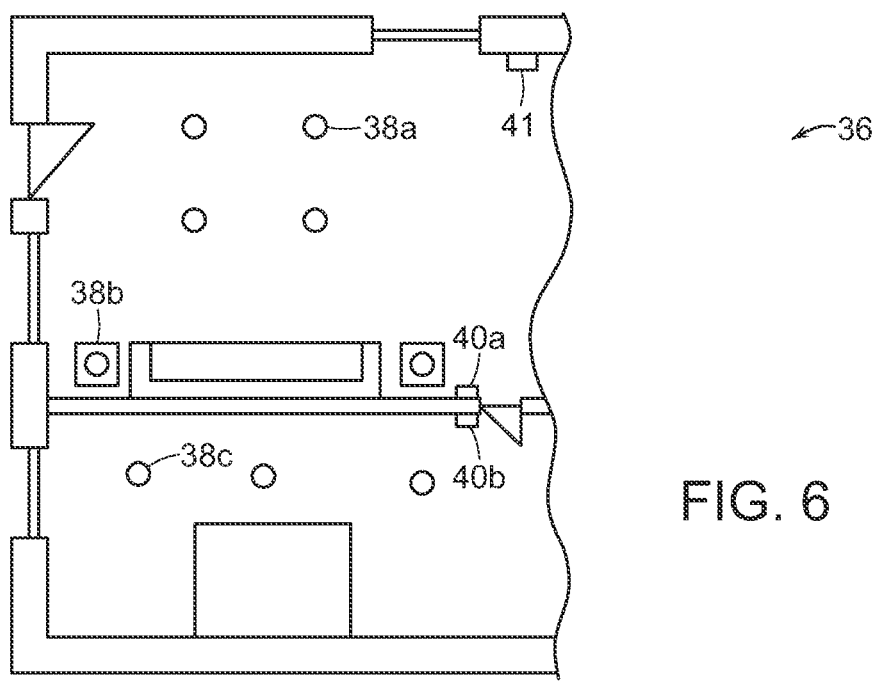
FIG. 6 is an exemplary plan diagram of a structure containing a plurality of illumination devices arranged in one or more groups within one or more rooms of a structure, with corresponding remote controllers also placed throughout one or more rooms within the structure.

FIG. 6 illustrates an example of a structure 36 containing a plurality of illumination devices 38. Illumination devices 38 are sometimes interchangeably referred to simply as lamps, fixtures, or luminaries. A residence 36 may have numerous rooms, such as bedrooms, living rooms, etc. Preferably each illumination device comprises at least one LED, and more preferably, several LED chains, where each chain can produce a corresponding color within a chromaticity region. Illumination devices 38 can include PAR illumination devices shown as downlights 38a within, for example, a living room, and other PAR illumination devices 38c as downlights within, for example, a bedroom. For example, the living room can have four downlights labeled 38a, whereas the bedroom can have three downlights labeled 38c. Next to the couch within, for example the living room, are tables on which, for example, A20 illumination devices 38b are configured.

Preferably, each illumination device includes a communication interface for a first communication protocol, that communication protocol being a wireless communication protocol used by all of the illumination devices 38 within, for example, residence 36. A popular first communication protocol can be WPAN using IEEE 802.15.4 and/or any protocol based thereon, like ZigBee. The illumination devices can therefore wirelessly communicate with each other, if desired. In addition to the illumination devices being wirelessly interconnected, remote controllers can also be interconnected, either wirelessly or wired. The remote controllers shown in FIG. 6 can be physical keypads 40a and 40b associated with, for example, the living room and bedroom, respectively. As will be noted later, the physical keypads can be replaced by virtual keypads, and assigned to, for example, a mobile phone and specifically the GUI shown on the mobile phone or mobile computer. The remote controllers can therefore be a physical keypad connected via a wire or wirelessly to the group or groups of physical illumination devices controlled by the physical keypad, or the remote controllers can be a computer-based portable device connected wirelessly to the group or groups of illumination devices controlled by a virtual keypad shown on a GUI of the wireless portable device. The virtual keypad shown on the GUI of the mobile device can appear identical to the physical keypads, with virtual triggers (i.e., buttons, sliders, etc.) similar to the actual triggers on the physical keypads. The physical keypads can communicate either through a wire, or wirelessly, to their corresponding illumination devices, whereas the virtual keypad shown on a GUI of a mobile device can communicate using a wireless communication protocol, such as WPAN, or ZigBee. Also, as opposed to the first communication protocol in which the physical lamp in the illumination devices 38 and the physical keypads 40 communicate, a second communication protocol is linked to the first communication protocol via a bridge 41 that can be placed in proximity to the residence and the residence 36 can allow a second communication protocol such as Ethernet, WiFi, Bluetooth, etc. to communicate from, for example, a mobile phone to the illumination devices 38.

Figure 7:
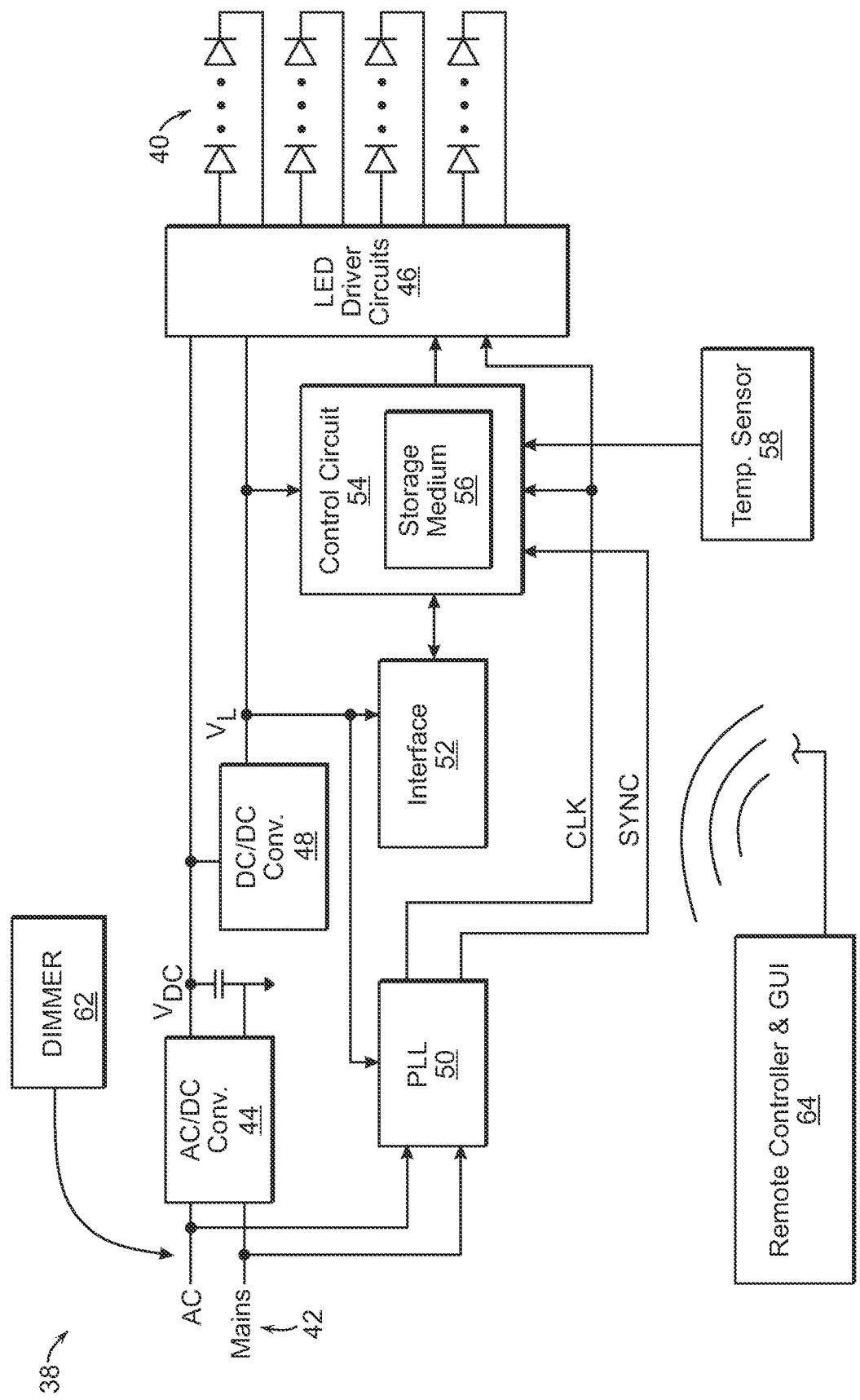
FIG. 7 is an exemplary block diagram of the illumination device comprising a power supply converter, LED driver circuit, control circuit controller and a plurality of different colored LED chains.

FIG. 7 illustrates an exemplary block diagram of illumination device 38, according to one embodiment of the invention. The illumination device illustrated in FIG. 7 provides one example of the hardware and/or software that may be used to implement a method of emulating natural sunlight both dynamically and automatically, and thereafter manually overriding that emulation when one or more lighting tasks are needed. The manual override may be needed to either perform a temporary task or to emulate more accurately the current outside sunlight conditions—e.g., change from a cloudless sunny outside sunlight condition to a cloudy or rainy condition.

Physical illumination device 38 comprises a plurality of emission LEDs 40, and in this example comprises four chains of any number of serially connected LEDs. Each chain may have two to four LEDs of the same color, which are coupled in series and configured to receive the same drive current. In one example, the emission LEDs 40 may include a chain of red LEDs, a chain of green LEDs, a chain of blue LEDs, and a chain of white or yellow LEDs.

However, the preferred embodiments are not limited to any particular number of LED chains, any particular number of LEDs within each chain, or any particular color or combination of the LED colors. In some embodiments, the emission LEDs 40 may be mounted on a substrate and encapsulated within a primary optic structure of an emitter module, possibly along with one or more photodetectors.

In addition to emission LEDs 40, illumination device 38 includes various hardware and software components for powering the illumination device and controlling the light output from the one or more emitter modules. In the embodiment shown in FIG. 7, illumination device 38 is connected to AC mains 42 and includes an AC/DC converter 44 for converting the AC mains voltage (e.g., 120V or 240V) to a DC voltage ($V_{DC}$). The DC voltage (e.g., 15V) is supplied to LED driver circuits 46 to produce the drive currents, which are supplied to the emission LEDs 40 for producing illumination. In the embodiment of FIG. 7, a DC/DC converter 48 is included for converting the DC voltage ($V_{DC}$) to a lower voltage $V_L$ (e.g., 3.3V), which is used to power the lower voltage circuitry of the illumination device, such as the phase-locked loop (PLL) 50, interface 52, and control circuitry 54. In other embodiments, illumination device 38 may be powered by DC voltage source (e.g., a battery), instead of AC mains 42. In such embodiments, the illumination device may be coupled to the DC voltage source and may or may not include a DC/DC converter in place of the AC/DC converter 44. Additional timing circuitry may be needed to provide timing and synchronization signals to the controlling driver circuits.

In the illustrated embodiment, PLL 50 is included within illumination device 38 for providing timing and synchronization signals. PLL 50 can lock onto the AC mains frequency and can produce a high speed clock (CLK) signal and a synchronization signal (SYNC). The CLK signal provides timing signals for control circuit 54 and LED driver circuits 46. In one example, the CLK signal frequency is in the tens of MHz range (e.g., 23 MHz), and is precisely synchronized to the AC mains frequency and phase. The SYNC signal is used by the control circuit 54 to create the timing signals used to control the LED driver circuits 46. In one example, the SYNC signal frequency is equal to the AC mains frequency (e.g., 50 or 60 HZ) and also has a precise phase alignment with the AC mains.

In some embodiments, interface 52 may be included within illumination device 38 for receiving datasets, or content, from an external calibration tool during manufacturing of the device, or during provisioning or commissioning of the illumination device, or group of illumination devices. The datasets or content received via interface 52 may be stored in a mapping table within storage medium 56 of control circuit 54, for example. Examples of dataset or content that may be received via interface 52 include, but are not limited to, the luminous flux (i.e., brightness values), intensity, wavelength, chromaticity of the light emitted by each LED chain (i.e., when mixed forms the color temperature) and, more specifically, as will be described in more detail below, (a) a mapping of brightness values to intensity values, and (b) color temperature to both brightness values and times of day values.

Interface 52 is not limited to receiving datasets or content during provisioning or commissioning of the illumination device or group of illumination devices. Interface 54 can also be used to receive commands from, for example, a remote controller 64. Commands can also be sent from dimmer 62 to control circuit (controller) 54. Dimmer 62 can be coupled to the AC mains, as shown, similar to a triac, to allow manual operation of the dimmer by a user. The triac of dimmer 62 changes the phase cut rms voltage on the AC mains, and forward the corresponding intensity value derived therefrom into the illumination device. By actuating a trigger button or slider on the remote controller 64 or dimmer 62, a dimming or reverse-dimming command in the form of an intensity value can be sent to driver circuits 46. As opposed to actuating a trigger on dimmer 62, a user can actuate a trigger (i.e., button or slider) on a user interface of a remote controller, such as a physical keypad or on a graphical user interface of a portable computer such as a smart phone or laptop to allow the dimming or reverse-dimming command to be sent from remote controller 64 via interface 52, either across a wire or wirelessly. A reduction in intensity value as a result of diming (or an increase in intensity value as a result of reverse-dimming), either via dimmer 62 or remote controller 64, will cause a decrease/increase in brightness due to the mapping table stored in medium 56 and fetched by the control circuit controller 54. For instance, commands may be communicated to illumination device 38 via dimmer 62 or remote controller 64 and interface 52 to turn the illumination device on/off, to control the brightness level and, as described below to manually and temporarily override the color temperature sunlight emulation show (daytime or nighttime) when performing a task or when performing a more accurate color temperature emulation to the actual sunlight condition—e.g., cloudy, rainy or overcast outdoor condition.

Interface 52 may comprise a wireless interface that is configured to operate according to ZigBee, WiFi, Bluetooth, or any other proprietary or standard wireless data communication protocol. In other embodiments, interface 52 could communicate optically using infrared (IR) light or visible light. Alternatively, interface 52 may comprise a wired interface to a wired physical keypad of remote controller 64, which is used to communicate information, data and/or commands over the AC mains 12 or a dedicated conductor, or a set of conductors. In another alternative embodiment, interface 52 may additionally or alternatively comprise an interface to a remote controller 64 wirelessly connected laptop or portable computer having a GUI, or to a physical keypad having a user interface or GUI or at least one trigger (e.g., button, slider, knob or switch) for controlling the illumination device 38. A skilled artisan would recognize that a number of different interfaces may be included within the illumination device for communicating information, commands and control signals.

According to one preferred embodiment, interface 52 is coupled for receiving control signals from a remote controller 64 and specifically from a user actuating a trigger on the remote controller 64 for altering an automatically changing illumination show among one or more groups of illumination device 38. As per the automatically changing illumination show, the remote controller 64 can include a timer that sends a plurality of times of day signals to the control circuit controller 54 via the interface 52. For example, if the remote controller 64 comprises a physical keypad 40 having a real time clock therein, the real time clock, depending on the calendar day and time of day, periodically sends a time of day signal from among a plurality of times of day signals. The time of day signal is unique to the calendar day and time of day recorded and output by the timer. If the time of day signals are sent, for example, every hour, only the specific time of day signal for that current hour is sent from among the plurality of times of day signals, each corresponding to a different hour.

Using the timing signals received from PLL 50 and the control signals from interface 52 (e.g., a periodic set of time of day signals sent from a remote timer to create a show having a change in daylight emulation as a function of time of day, and a dimmer to perform a dim function to change intensity values a desired brightness level), control circuit controller 54 calculates, based on brightness and color temperature mappings as a function of brightness and time of day stored in medium 56, and produces values indicating a desired drive current to be supplied to each of the LED chains 40. This information may be communicated from control circuit controller 54 to LED driver circuits 46 over a serial bus conforming to a standard, such as SPI or I²C, for example. In addition, control circuit 54 may provide a latching signal that instructs the LED driver circuits 46 to simultaneously change the drive currents supplied to each of the LED chains 40 to prevent brightness and color artifacts.

In some embodiments, controller 54 may be configured for determining the respective drive currents needed to achieve a desired luminous flux and/or a desired chromaticity for the illumination device in accordance with one or more of the compensation methods described in U.S. patent application Ser. No. 14/314,530 published on Dec. 31, 2015 as U.S. Publication No. 2015/0382422 A1; Ser. No. 14/314,580 issued on Jul. 12, 2016 as U.S. Pat. No. 9,392,663; and Ser. No. 14/471,081 published on Mar. 3, 2016 as U.S. Publication No. 2016/0066384 A1, which are commonly assigned and incorporated herein in their entirety. In a preferred embodiment, control circuit controller 54 may be further configured for adjusting the drive currents supplied to the emission LEDs 40, so as not to exceed a maximum safe current level or a maximum safe power level attributed to one or more power converters of the illumination device 38 at a present operating temperature as determined by temperature sensor 58.

As shown in FIG. 7, temperature sensor 58 may be included within the illumination device 38 for measuring a present operating temperature of the illumination device. In some embodiments, temperature sensor 58 may be a thermistor, which is thermally coupled to a circuit board or chip comprising one or more of the components shown in FIG. 7. For example, temperature sensor 58 may be coupled to a circuit board comprising AC/DC converter 44, DC/DC converter 48, PLL 50 and interface 52. In another example, temperature sensor 58 may be thermally coupled to the chip comprising LED driver circuits 46 and emission LED chains 40. In other embodiments, temperature sensor 58 may be an LED, which is used as both a temperature sensor and an optical sensor to measure ambient light conditions or output characteristics of LED chains 40. The temperature measured by the sensor 58 is supplied to the controller 54 for adjusting the drive currents.

In some embodiments, control circuit controller 54 may determine the respective drive currents by executing program instructions stored within storage medium 56. In one embodiment, the storage medium 56 that stores the first and second mappings may be a non-volatile memory, and may be configured for storing the program instructions along with a table of calibration values, as described for example in U.S. patent application Ser. No. 14/314,451 published on Dec. 31, 2015 as U.S. Publication No. 2015/0377699 A1, and Ser. No. 14/471,057 issued on Dec. 31, 2015 as U.S. Pat. No. 9,392,660, which are commonly assigned and incorporated herein in their entirety. Alternatively, control circuit controller 54 may include combinatorial logic for determining the desired drive currents, and storage medium 56 may only be used for storing the mapping tables of intensities as a function of brightness values, and color temperatures as a function of brightness values and times of day.

In general, LED driver circuits 46 may include a number (N) of driver blocks 68 equal to the number of emission LED chains 40 included within the illumination device 38. In one exemplary embodiment, LED driver circuits 46 comprise four driver blocks 68, each configured to produce illumination from a different one of the emission LED chains 40. In some embodiments, LED driver circuits 46 may comprise circuitry for measuring ambient temperatures, measuring photodetector and/or emitter forward voltages and photocurrents, and adjusting the LED drive currents. Each driver block 68 receives data indicating a desired drive current from control circuit 54, along with a latching signal indicating when the driver block 68 should change the drive current.

Figure 8:
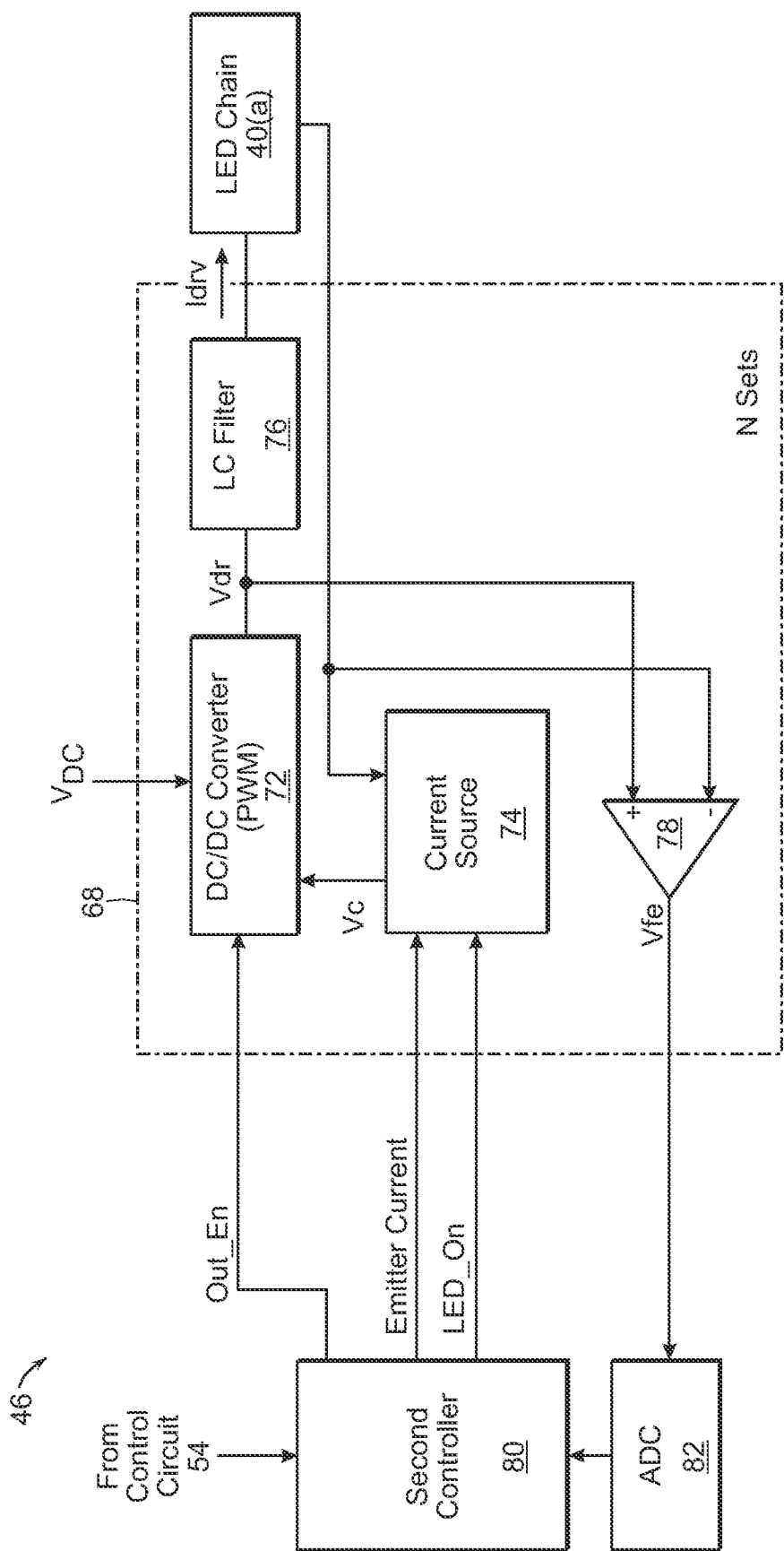
FIG. 8 is an exemplary block diagram of the LED driver circuit that may be included within the illumination device of FIG. 7.

FIG. 8 is an exemplary block diagram of LED driver circuits 46, according to one embodiment of the invention. In the exemplary embodiment of FIG. 8, LED driver circuits 46 include four driver blocks 68, each block including a DC/DC converter 72, a current source 74, and an LC filter 76 for generating the operative drive currents (Idrv) supplied to a connected chain of emission LEDs 40a to produce illumination, and the relatively small drive currents (Idrv) used to obtain emitter forward voltage (Vfe) measurements. In some embodiments, DC/DC converter 72 may convert the DC voltage ($V_{DC}$) into a pulse width modulated (PWM) voltage output (Vdr) when controller 80 drives the "Out_En" signal high. This PWM voltage signal (Vdr) is filtered by LC filter 76 to produce a forward voltage on the anode of the connected LED chain 40a. The cathode of the LED chain is connected to current source 74, which forces a fixed drive current (Idrv) equal to the value provided by the "Emitter Current" signal through LED chain 40a when the "Led_On" signal is high. The "Vc" signal from current source 74 provides feedback to the DC/DC converter 72 to output the proper duty cycle and minimize the voltage drop across current source 74.

As shown in FIG. 8, each driver block 68 may also include a difference amplifier 78 for measuring the forward voltage (Vfe) drop across the connected chain of emission LEDs 40a. When measuring Vfe, DC/DC converter 72 is turned off and current source 74 is configured for drawing a relatively small drive current (e.g., about 1 mA) through the connected chain of emission LEDs 40a. The forward voltage drop (Vfe) produced across LED chain 40a by that current is measured by the difference amplifier 78, which produces a signal equal to Vfe. The forward voltage (Vfe) is converted to a digital signal by analog to digital converter (ADC) 82 and supplied to controller 80. Second controller 80 determines when to take forward voltage measurements and produces the Out_En, Emitter Current and Led_On signals, which are supplied to each of the driver blocks 68.

LED driver circuit 46 is not limited to the embodiment shown in FIG. 8. In some embodiments, each LED driver block 68 may include additional circuitry for measuring photocurrents, which are induced across one or more of the emission LED chains 40, when these chains are configured for detecting incident light (e.g., ambient light or light emitted from other emission LEDs). In some embodiments, LED driver circuit 46 may additionally include one or more receiver blocks (not shown) for measuring forward voltages and/or photocurrents induced across one or more photodetectors, which may also be included within the emitter module. In some embodiments, LED driver circuit 46 may include a temperature sensor for measuring a temperature of the driver circuitry and a multiplexer for multiplexing the emitter forward voltages (Vfe) and measured temperatures to the ADC 82. Exemplary embodiments of such a driver circuit are described in the previously mentioned co-pending applications.

DC/DC converter 48 and DC/DC converters 72 may include substantially any type of DC/DC power converter including, but not limited to, buck converters, boost converters, buck-boost converters, Ćuk converters, single-ended primary-inductor converters (SEPIC), or flyback converters. AC/DC converter 44 may likewise include substantially any type of AC/DC power converter including, but not limited to, buck converters, boost converters, buck-boost converters, Ćuk converters, single-ended primary-inductor converters (SEPIC), or flyback converters. Each of these power converters generally comprise a number of inductors (or transformers) for storing energy received from an input voltage source, a number of capacitors for supplying energy to a load, and a switch for controlling the energy transfer between the input voltage source and the load. The output voltage supplied to the load by the power converter may be greater than or less than the input voltage source, depending on the type of power converter used.

According to one preferred embodiment, AC/DC converter 44 comprises a flyback converter, while DC/DC converter 48 and DC/DC converters 72 comprise buck converters. AC/DC converter 44 converts the AC mains power (e.g., 120V or 240V) to a substantially lower DC voltage $V_{DC}$ (e.g., 15V), which is supplied to the buck converters 48/72. The buck converters 48/72 step down the DC voltage output from the AC/DC converter 44 to lower voltages, which are used to power the low voltage circuitry and provide drive currents to the LED chains 40.

In some embodiments, the brightness level may be adjusted from the dimmer 62 or remote controller 64 substantially continuously between a minimum level (e.g., 0% brightness) and a maximum level (e.g., 100% brightness), or vice versa. The adjustment can be linear, but in most cases due to the difference in slider adjustment on the dimmer and remote controller 64 in relation to the brightness output, the adjustment is non-linear and is more on a logarithmic scale as shown in and described in FIG. 12. Specifically, the movement of a trigger position (movement of a slider, amount of time depressing a button, or whether one or multiple buttons are depressed) translates to the intensity value. The position of the trigger position can correspond to an intensity value, but the trigger position/status or intensity value is non-linear with respect to the brightness level. Thus, actuation of the trigger does not translate to exact "one-to-one" changes on of the brightness level. A non-linear mapping is needed. By defining the brightness level as a 16-bit variable scaling can be easily accomplished. In other embodiments, the brightness level may be adjusted between a limited number of predefined steps, wherein each step corresponds to a percent change in brightness (e.g., 0%, 25%, 50%, 75% or 100% maximum brightness) or a decibel change (e.g., +/−1 dB) in lumen output.

FIG. 9 illustrates an example in which actual physical illumination devices 38 are grouped based on their location and function. The mechanism for providing the grouping as well as the function of the illumination devices will be disclosed later when describing the grouping mechanism as well as the scene/show assignment mechanism. However, as shown in FIG. 9, a location such as the bedroom can have a group of illumination devices 38 and, associated with that group of illumination devices 38, is a particular scene or show. Since each of the illumination devices 38 has one or more LEDs, the RGB of the plurality of LEDs can be tailored to any color, brightness or visual effect desired by the user by setting a scene or a time-changing show within the grouped illumination devices.

FIG. 9 illustrates a plurality of physical illumination devices appearing as virtual illumination devices on a graphical user interface of a remote controller 64, and specifically the GUI 85 of remote controller 64. The virtual illumination devices 39 correspond to respective actual illumination devices 38 within the structure. In addition to physical illumination devices 38 are physical keypads 40, shown in FIG. 6, spaced throughout the interior of a structure. The illumination devices 38 can have any type of form factor including A20, PAR38, linear cove, wall washing lights, and track lights. The keypads 40 can be mounted in a signal gang junction box and coupled to the AC mains. Moreover, virtual keypads appearing on the wireless or wired remote controller 64 can eliminate the physical keypads 40. The virtual keypads can exist on GUI applications on computers, and specifically mobile devices like a smartphone. The keypads, whether physical or virtual, are typically described as a remote controller 64 if the remote controller consists of a wired physical keypad or a wireless mobile device having a GUI on which the virtual keypad is shown. In addition to the network of physical illumination devices 38 and physical keypads 40, a remote controller 64 is used to control the communication to and from the network of physical illumination devices 38 and physical keypads 40. Remote controller 64 is essentially an execution unit that executes on instructions and data to present a GUI the user can use to perform the grouping and scene/show assignments described in FIGS. 10b and 10c. Control instructions are sent through a communication interface from controller 64 to the network of illumination devices 38. The communication interface for controller 64 simply communicates correctly to the illumination devices and keypads using, for example, ZigBee communication protocol. Remote controller 64, can also communicate through a different protocol if a bridge or hub is needed to bridge between ZigBee protocol in which the illumination devices 38 communicate and the protocol used by remote controller 64. For example, a software application can operate on controller 64, possibly on either Apple or Android mobile devices to present the virtual keypad on controller 64. A hub or bridge connects between WiFi and the wireless lamp network which can use ZigBee. If remote controller 64 communicates directly without an intermediate bridge or hub, then a dongle with a radio interface will allow the GUI of remote controller 64 to communicate directly with the network of physical illumination devices 38 and physical keypads 40.

A typical installation in a structure will have physical keypads 40 and a variety of physical illumination devices 38 in every room. In some cases, some rooms may have multiple keypads controlling the same illumination devices just like conventional two or three-way light switches, where a three-way switch uses two switches and a two-way switch uses one switch—on/off. The physical keypads 40 in each room then control the color, brightness, spectrum, or visual effects in general. The keypads can control such effects either statically, or as a function of time. A static control would simply be a user pushing a trigger button or slider on the physical keypad. The illumination devices 38 and physical keypads 40 in a residence can also be controlled by a computer running an application with a radio-based dongle plugged into a USB port, or can be controlled by a mobile device, such as a smartphone also running a software application. The dongle can communicate ZigBee messages directly, whereas the bridge or hub converts between WiFi and the ZigBee messages, for example.

After the physical illumination devices 38 and physical keypads 40 are installed in a structure, the physical illumination devices 38 and physical keypads 40 must be discovered before the grouping and scene building procedures. Thus, a first step when using, for example, a controller with a dongle is to discover all the illumination devices and keypads within range of that controller. The wireless network that the illumination devices 38 and keypads 40 use is preferably a mesh network, so illumination devices or keypads that are physically distant may still be in communication range of the controller through one or more hops. When a user instructs the controller to discover all devices, possibly through a command on the GUI of the controller, the dongle broadcasts a message instructing all devices that receive the message either directly or through any number of hops, to respond with their unique ID number, often times referred to as the MAC address. The unique MAC addresses of each of the illumination devices, as well as the keypads, are sent back to the remote controller 64. If the remote controller 64 is a personal computer or a phone having a screen, it displays on that screen a set of GUI icons as virtual illumination devices representing the corresponding physical illumination devices that have responded. The icons are referred to as the virtual illumination devices since a need exists to distinguish between the illumination devices that appear on the GUI as virtual illumination devices 39 and illumination devices that exist in the residence, or physical illumination devices 38.

For example, as shown in FIG. 9, in an installation with six PAR physical illumination devices 38 in a structure, six virtual illumination device 39 icons will appear. The keypads will appear at a later step also as virtual keypad icons. An indication that all of the illumination devices have been discovered occurs when an acknowledge message is sent back from each of the illumination devices to the remote controller, which causes each physical lamp to turn blue, and each physical keypad to blink. Moreover, each of the discovered physical illumination devices and physical keypads will appear as virtual illumination devices and virtual keypad icons on the GUI. If all of the physical illumination devices do not turn blue or the keypads blink upon user inspection by walking around the residence, not all acknowledge messages have been returned and thus the missing acknowledge message of the unique MAC lamp address would indicate a non-blue physical lamp has not been discovered. Remedial measures would then need to be taken, as described below. However, if all physical illumination devices turn blue on physical inspection, then the corresponding icons will appear and all of the physical illumination devices within the residence will appear as icons on the controller GUI.

After all of the physical illumination devices and physical keypads have been discovered, the next step is grouping. In the grouping procedure or mechanism, physical illumination devices that need to be controlled together are assigned a specific group address. As shown in FIG. 9, during the grouping mechanism group addresses are downloaded into storage medium 56 of each illumination devices. Thereafter, during a control mechanism, a single button actuation of a physical keypad 40, or actuation of a group name assigned to a virtual button of a virtual keypad will cause a control message to be sent from the controller to address via a single groupcast message all of the unique MAC addresses associated with that unique group address to launch the content associated with that group of physical illumination devices via microprocessor fetch mechanism. Further descriptions of the group addressing, and storage of content within illumination devices 38 occur during the grouping mechanism, as well as the scene builder or show builder mechanism.

There can be different types of remote controllers 64, and particularly the communication protocols applied to the plurality of illumination devices 38. A remote controller 64 can simply include a dongle with a USB interface and radio plugged into the USB port of a mobile device. If remote controller 64 is to communicate through a hub or bridge, then remote controller 64 communicates using a different protocol then the protocol at which the various illumination devices 38 communicate with each other as well as the physical keypad 40.

During the discovery phase, for example, the broadcast discovery signal is sent from the remote controller 64 through the mesh network from hop-to-hop, with an acknowledge-back from, for example, unique address, to unique address, to unique address, e.g., in hexadecimal. The broadcast discovery and acknowledge back forms a routing table with a destination address and next hop address for a particular lamp. The routing table is stored in the memory of illumination device 38 along with what we will described later as the group address, as well as the content associated with that group address. The group address and content can have a group address of, for example F and C, respectfully, forming the groupcast table. An example of an illumination device discovery, groupcast table formulation and content (scene/show builder) for various groups of illumination devices and the flow diagram of each procedure is set forth in commonly assigned U.S. patent application Ser. No. 15/041,166, which is commonly assigned and herein incorporated by reference in its entirety.

The discovery process can be initiated by sending a discovery message. At least once, after the illumination devices 38 have been installed, a network configuration may be necessary. Such a network configuration may be repeated, if necessary. Typically, the configuration or discovery procedure is only done once. However, if an illumination device is replaced, the discovery process must be repeated any time the illumination system is modified. Thus, the discovery process can be done if the network is modified or reconfigured, if illumination devices are added or removed, or a modification of lighting scenes occurs. When configuring the network during the discovery phase, remote controller at first has no knowledge about the available illumination devices. The structure of the illumination system network is not predetermined by installation like the cabling structure of a wired network. Instead, it may be determined by the plurality of physical conditions, like the distance or shielding materials between neighbored illumination devices, walls, or other devices between the illumination devices, or even by electromagnetic interference by electric appliances or other devices within the structure 36.

To compute the network configuration, preferably a broadcast is triggered by the controller 64. The broadcast message is transmitted by addressing the messages to a pre-defined broadcast address, to which all physical devices (illumination devices and keypads) are listening. For example, the broadcast signal will be received first by those devices that are in close proximity to the controller. Those illumination devices can then forward the broadcast message to other illumination devices, which further forwards the message to even further distal illumination devices via one or more hops. To complete the network configuration, it is necessary that the controller receives an acknowledge signal from each lamp, by which the lamp acknowledges that it has received a broadcast message. The acknowledge signal is preferably transmitted as a unicast or directed message back to the controller that sent the broadcast. Each illumination device that sends such a unicast message must receive an acknowledge to prevent such illumination devices from resending the same message. Thus, the return acknowledge is sent by controller back through the mesh network, also as a unicast message.

During the discovery phase, or discovery process, it is fairly time consuming to broadcast, receive and acknowledge back, and thereafter send an acknowledge reply. However, since the discovery process happens infrequently, and only generally during the configuration of illumination devices during initial install, a time-consumptive discovery process that could take multiple seconds is generally acceptable to the user. However, when subsequently controlling the discovered illumination devices, any time delay or lag, and especially any popcorn effect is to be avoided. Even a fraction of a second, in some instances, is noticeably annoying to a user when performing control using the subsequently described groupcast and aggregated acknowledge mechanism.

The discovery procedure, albeit relatively slow compared to the control procedure begins with a broadcast discovery message through which that message is routed through possibly multiple hops to all of the various nodes, including physical illumination devices 38 and physical keypads 40. Each of those nodes, keypads and illumination devices unicast and acknowledge back to the remote controller 64, which must be routed as an acknowledge signal through the mesh network, whereupon the remote controller 64 then receives the acknowledge hopefully having all of the unique MAC addresses of the physical illumination devices by indicating a blue light output from all such illumination devices and a blinking physical keypad of the discovered keypads.

FIG. 9 illustrates the grouping procedure, where a GUI on the remote controller 64 is used to group not only virtual illumination device 39 icons, but also the physical illumination devices 38 based on any group named by a user, or pre-existing groups with pre-existing scenes assigned thereto. FIG. 9 illustrates a GUI displayed on a remote controller 64 if the remote controller 64 has a screen similar to that of a portable computer or phone. Upon the GUI, on a left hand portion of the GUI is an icon that represents either groups or keypads. When the groups icon is selected, as indicated, a series of groups A, B, C, etc., can appear. According to one embodiment a series of group icons 90 appear. According to one embodiment, the group icons are not named until a user provides a name. Thus, for example, group A may be a name given to a group icon, or simply could be a default name given to a group icon. The groups shown as icons on the GUI of the remote controller 64 can have pre-defined names, such as the bedroom downlight or the bedroom night stand. In the latter embodiment, those pre-defined names may also have pre-defined scenes or shows. For example, the bedroom downlight may have a pre-defined scene or show that is uniquely assigned to the downlights, or illumination devices in the bedroom as content stored in that group of illumination devices. The uniquely assigned scene/show is preferably different from the pre-defined scene or show associated with the bedroom night stand group of illumination devices, for example. As shown in FIG. 9, after all of the illumination devices have been discovered and appear as virtual illumination devices 39, or icons, in the right portion of the GUI 85, one or more illumination devices can be grouped by clicking on the virtual illumination device in the GUI and that virtual illumination device icon 39, may blink or change to a different color. The corresponding physical illumination device or lamp 38 within, for example, a bedroom will also change color, or blink, as shown by physical illumination devices blinking that corresponds to a virtual illumination device 39 icon blinking. In this fashion, the user will then know the correspondence between virtual illumination device icons and physical illumination devices so that when he or she performs the grouping procedure it is known which illumination device (virtual icon and physical) is assigned to each group as shown in FIG. 9, where the bedroom down illumination device 38 corresponding to virtual illumination device 39 is assigned to group A.

As an example, if there are three rooms with one keypad in each room (i.e., kitchen, living and bedroom), in the bedroom there may be two A20 illumination devices on night stands and two PAR38 illumination devices in the ceiling. The user may want to control these two groups of physical illumination devices independently so that two groups are created called bedroom downlights and bedroom night stands, and these groups are shown as another group name in groups 90 of the GUI 85. In the living room, there may be three A20 illumination devices and four PAR38 illumination devices. The user may want to create three named group icons 90 comprising one A20 on an end table next to a chair, two A20s on either end of the couch, and four PAR38s in ceiling, so three groups are created called living-downlight, living-end table-chair, and living-end table couch. The named group icons can be named by the user, or can be pre-defined with pre-defined scenes and shows associated therewith. In the kitchen, there may be four PAR38s in the ceiling that are controlled together, so a group called kitchen-downlight is created, or may pre-exist with an associated scene/show.

Using the example above, there are six groups of virtual illumination device icons on the left side, with ten PAR38 lamp icons (virtual illumination devices) and five A20 lamp icons (virtual illumination devices) on the right side of the GUI. All the lights are still blue. When a lamp icon is clicked on by the user, the corresponding physical lamp and its associated MAC address changes color momentarily, as shown when, for example, the virtual illumination device icon is clicked on. The user will enter, for example, the bedroom and will note the corresponding physical illumination device changes color or flashes indicating its correspondence to virtual illumination device. The user then, for example, drags and drops the two virtual lamp icons into the group on the left called group A, or "bedroom-night stands," for example. This process can continue for the other groups where, for example, the user can click on the PAR38 virtual lamp icons until the two in the bedroom are identified and then drags and drops those virtual lamp icons into the group called group B, or "bedroom-downlights," for example. When a virtual lamp icon is dropped into a group, the associated physical lamp turns back to its default light color, for example. The user can perform the same grouping procedure in the living room, kitchen, or throughout the structure.

At this point, all virtual illumination device icons on the right side of the GUI are gone since they have been, for example, dragged and dropped into a corresponding group named group icon 90. Moreover, all of the physical illumination devices are producing white light. The next step is to configure the physical keypads in each room. Configuration of the virtual keypads using, for example, a mobile phone control device will be described later. However, at the present, configuration of physical keypads is described. When configuring the keypads, the user can click on a different tab, for example, tab B, rather than tab A at the top of the GUI. By clicking on another tab associated with keypads, the buttons on each keypad can be configured to produce a particular brightness, color, spectrum setting and visual attribute setting for a particular group of illumination devices. The device control procedure of configuring specific buttons on a physical keypad is shown in more detail in reference to FIGS. 10a, 10b and 10c.

Figure 10A:
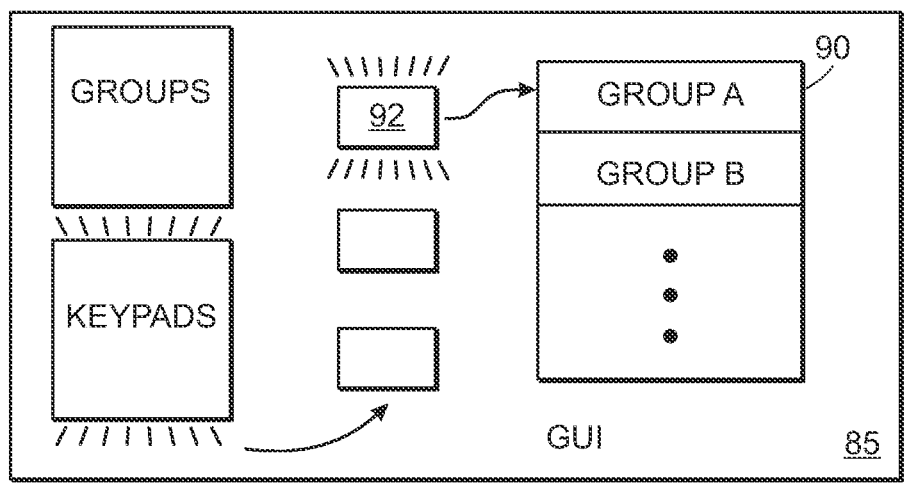
FIG. 10a is an exemplary GUI of the controller shown in FIG. 7, further illustrating the assignment of groups of illumination devices to, for example, a keypad button.
Figure 10B:
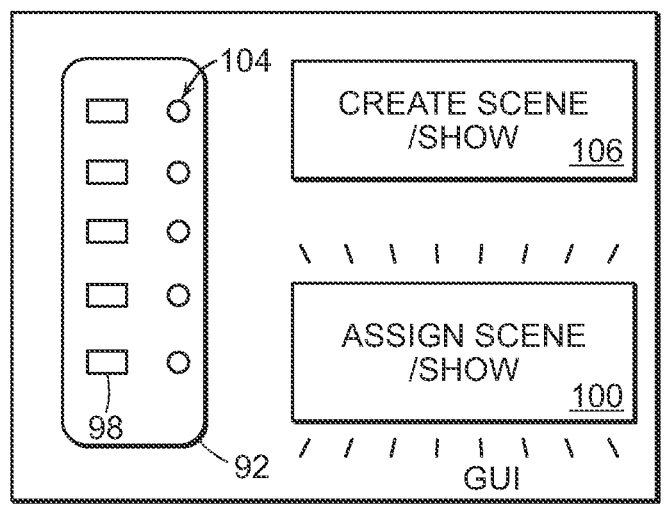
FIG. 10b is an exemplary GUI of the controller shown in FIG. 7, further illustrating the assignment of a scene or scene which changes as a function or time (i.e., show) to one or more groups previously assigned to, for example, a keypad button.

For example, configuring a particular keypad begins by selecting the keypad, as shown in FIG. 10a as the selection of the virtual keypad icon 92 after clicking on the keypad icon in the left portion of the GUI 85. Once the virtual keypad icon 92 is identified, keypad icon 92 can be assigned to one or more group icons 90 to be named or a pre-defined named group icon. Thereafter, as shown in FIG. 10b, the GUI 85 changes its display and presents a virtual keypad 92, with corresponding virtual trigger buttons 98. Virtual buttons 98 can be replaced by a virtual slider, all of which fall within the category of a trigger. Five virtual buttons are shown, however, there could be more or less buttons as needed. A scene or show can be associated with a virtual scene/show icon 100 selected and dragged and dropped onto the corresponding trigger button 98. In this fashion, each button on the virtual keypad 92 can operate as a trigger slider. The longer a button is depressed, the greater the slider position. Each trigger button can have associated control over one or more groups of physical illumination devices 38 within a structure, and a corresponding scene or show assigned to each of those group of illumination devices 38 by downloading corresponding content to the physical illumination devices 38. Assignment of a group or a scene/show can also be performed from a dropdown menu, instead of drag and drop technique.

As an example, if there are two buttons that control the bedroom-downlight group and the bedroom-night stand group, the top two buttons could control each of those groups. The user assigns a particular color temperature, brightness or any visual attribute to each of the various buttons and, in this case, the virtual buttons of the virtual keypad 92. The bottom button, for example, can be assigned to all of the groups controlled by the corresponding physical keypad, and the bottom button can be assigned to turn off all the lights associated with the various groups attributable to that keypad. The process describing grouping of buttons to a bedroom can be repeated for the living room, the kitchen, and all of the remaining physical keypads within the structure. Grouping occurs through virtual keypad configuration that then corresponds to the appropriate physical keypads. Trigger buttons are selected and assigned to pre-defined or non pre-defined groups of illumination devices, as well as scenes and shows controlling those groups.

After programming into the various virtual buttons of the virtual keypad displayed on the controller 64 GUI, the corresponding group addresses and corresponding content of the assigned scenes and shows are downloaded from the virtual keypad 92 to the corresponding physical keypad 40 of FIG. 1. The physical keypad 40 will operate identical to the virtual keypad 92, in that touching any button corresponding to the five buttons on the virtual keypad will send a groupcast control message to the physical illumination devices being controlled by the physical keypad. Moreover, similar to the identification of physical illumination devices when performing grouping of virtual lamp icons, the physical keypad 40 associated with the virtual keypad 92 will blink when that virtual keypad is selected. For example, when virtual keypad 92 is selected within the GUI of controller 64, the corresponding physical keypad 40a, 40b, etc., will blink indicating to the user which keypad within the structure has been selected.

As shown in FIG. 10b, along with the five virtual buttons 98 of the virtual keypad 92 are up/down buttons 104. The up/down trigger buttons can be programmed in the virtual keypad 92 and have a corresponding similar programmed effect in the physical keypad 40. For example, once a corresponding button on the physical keypad 40 is actuated after having been programmed using the virtual button on the GUI, the corresponding group of physical illumination devices turn on. The physical keypad 40 or virtual keypad 92 may have buttons or touch lights corresponding to the virtual trigger slider up/down buttons 104, which are operable on the virtual keypad as well as on the physical keypad to adjust brightness of the lights controlled by the last button pushed on the physical/virtual keypad, for example. For instance, if the top button of the physical or virtual keypad associated with the bedroom sets the bedroom-downlight to red at half brightness, the up/down arrows would adjust the brightness of the bedroom-downlight after the top button of the physical/virtual keypad is pushed. The up/down arrows would control the brightness of the bedroom nightstands after, for example, another button associated with the group of bedroom nightstand was pushed. When an up/down arrow is pushed, a message is sent using groupcast addressing to the group of physical illumination devices associated with the keypad button. Alternatively, the up/down trigger 104 can control all of the groups of illumination devices controllable by that keypad. For example, all groups associated with the virtual or physical keypad are dimmed or reverse-dimmed together, not just the ones controlled by the last button 98 pushed. Also, as noted above, the trigger can include buttons 98 or the up/down buttons 104. The duration at which a button 98 is depressed operates as a trigger slider, or the appropriate up/down button 104 among the group of five, for example, can also operate as a trigger slider for the last button 98 depressed or all buttons 98 assigned to all illumination devices within one or more rooms controlled by those buttons 98.

According to one embodiment, the group assigned to a virtual button on a virtual keypad, and thus to the physical button on the physical keypad can also be assigned to a pre-defined scene or show through use of a drop down icon. The drop-down notes the pre-defined scene or show applied to a group, and through the GUI of controller 64, the group and its corresponding scene or show is applied to, for example, a virtual button on the virtual keypad 92 which then downloads that group, scene or show to a physical button on the corresponding physical keypad that was blinking to indicate it was selected for programming. After all of the buttons have been programmed to their corresponding pre-defined group name with pre-defined scene and show, or according to another embodiment, to any user-defined, and non pre-defined group name or scene and show, the physical keypad can discontinue the blinking that occurs during the discovery/configuration process. Once the virtual keypad icon is dragged and dropped on the left side of the GUI screen, the user can then enter a name for that keypad, like "bedroom_1", for example. To program the buttons on the virtual/physical keypad, the user selects the virtual keypad on the left of the GUI screen 85, which is preferably pre-named something identifiable to the user.

Figure 10C:
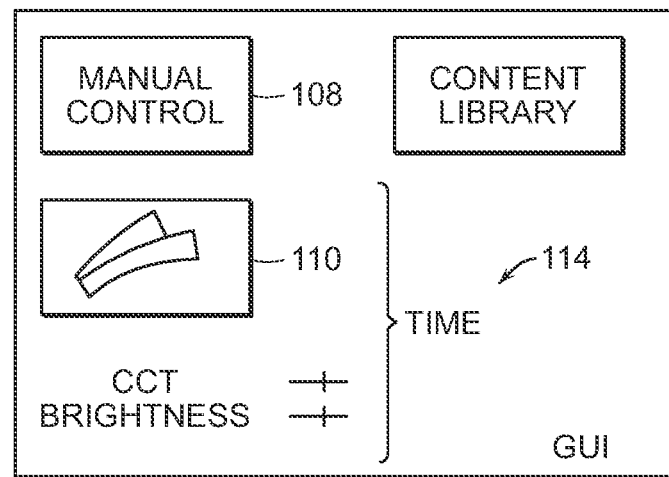
FIG. 10c is an exemplary GUI of the controller shown in FIG. 7, further illustrating the assignment of color and brightness to each scene and assignment of a time for invoking each scene to formulate a show.

According to one embodiment, if the scene and show was not pre-defined and assigned to a pre-defined group name, but instead is defined by a user to allow a button to take on any possible, substantially unlimited number of scenes or shows, a user can select the create scene or show button 106 as shown in FIG. 10b. A corresponding GUI will then appear on the remote controller 64 as shown in FIG. 10c. The GUI allows the user to manually control any color temperature, brightness or visual attribute to be assigned, by clicking on the manual control 108. The manual control can then bring up a black body curve 110 to allow a user to pick any color temperature along that black body curve 110, or to manually select a visual attribute, color temperature (CCT) and/or brightness, etc. using sliders 112 for each. Moreover, the user can assign times, either in increments or time of day 114, for each attribute, color temperature or brightness to produce the automatically changing color temperature of a show. The time can be programmed to, for example, daytime to automatically and dynamically change color temperature throughout the day from sunrise to sunset. The show can also extend past sunset, to nighttime. The change in color temperature output from the designated group or groups of illumination devices assigned the created show is automatic depending on shows stored in the corresponding group or groups of illumination devices. The change in color temperature can also be effectuated as a series of scenes triggered by a plurality of times of day signals sent from a timer within the remote controller (either a virtual keypad 92 or a physical keypad 40). Thus, the remote controller 64 includes a real time clock that produces a plurality of times of day signals based on the calendar day and time of day during daylight hours. Those times of day signals can be synchronized via connection to a crystal oscillator, via connection to the Internet or to a satellite. Depending on which of the plurality of times of day signals is sent, the color temperature output from the corresponding group of illumination devices responds via a groupcast signals sent to the grouped set of illumination devices MAC addresses. A different time of day signal is sent at different times throughout the daylight hours to trigger a different color temperature output from the addressed group of illumination devices. A user can therefore program the bedroom group of illumination devices to operate to a different emulated sunlight than, for example, the kitchen group of illumination devices. Even though the same time of day signal is sent to both the bedroom and kitchen groups (e.g., mid morning), the show stored in the bedroom illumination devices may produce a lower color temperature of 2300 Kelvin, or be off, whereas the kitchen illumination devices may produce a higher color temperature nearing 6000 Kelvin. Alternatively, the user can program the time of day signals at different times for the kitchen versus the bedroom. For example, the sunrise time of day signal may be earlier in the bedroom than in the kitchen. Having a separate remote controller for the kitchen verses the bedroom, and programming differently the timers in each allows selective modification of the show and, thereafter selective manual override of each.

Figure 11:
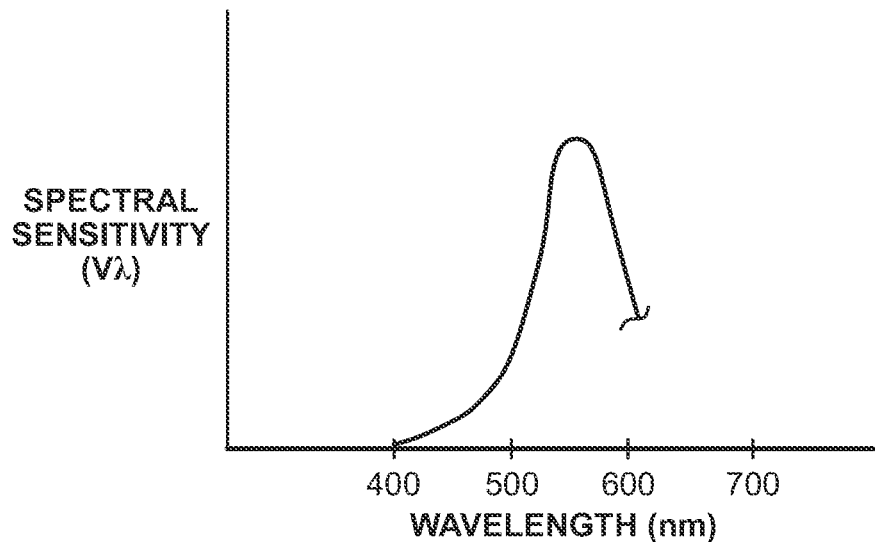
FIG. 11 is a graph of the spectral sensitivity of brightness at different color wavelengths.
Figure 12:
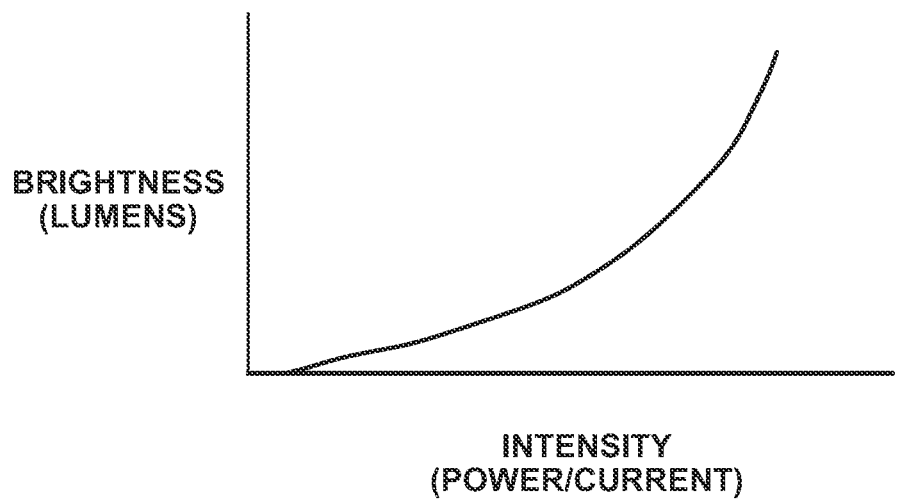
FIG. 12 is a graph of brightness at different intensities, such as power or current, supplied to the illumination device.

Turning now to FIG. 11, a graph is shown of the spectral sensitivity of brightness at different color wavelengths. Even though the illumination devices of the various wavelengths are equal in power from a physical standpoint, the visual system is not equally sensitive to different wavelengths. For example, luminance or brightness can be expressed even though lights of equal power should produce the same effect at all spectral wavelengths, indeed, not all wavelengths appear equally bright. Photopic luminance is defined as $L=c\int P(\lambda)V(\lambda)d\lambda$, where P is spectral power and V is the photopic spectral sensitivity of the standard observer. As shown in FIG. 11, luminance can be expressed in the fact that illumination devices of equal power but different wavelengths do not appear equally bright to the standard observer. Further details about the relationship between color temperature as a function of brightness and also time of day will be described later in reference to FIG. 15. According to one embodiment, however, it is sufficient to acknowledge that the lower color temperatures are affected more so by changes in brightness and time of day than the higher color temperatures. According to another embodiment, a variable brightness throughout the day yet with the same change in brightness can produce the same change to color temperature throughout the day. FIG. 12 illustrates what occurs when a remote controller 64 such as a virtual/physical keypad receives user actuation upon, for example, a trigger slider to produce different intensity values sent to the interface 52. The intensity values correspond to trigger position values. The relationship between trigger position/status and lumen output has the characteristics shown in FIG. 12. The controller 54 converts trigger position/status position to lumen output and color temperatures through tables and interpolation. Those conversion functions are different at different times of day. Once the desired lumen output and color temperatures are known, the controller 54 calculates the drive currents needed for each LED chain. That value applied to all of the LED chains is a value of current or power needed to change the brightness output from all of the LED chains.

As noted in FIG. 12, changes in the slider movement to produce changes in intensity on the virtual/physical keypad, or on a triac dimmer associated with the physical keypad, resulting brightness will change in a non-linear fashion. In other words, a non-linear relationship exists between the slider movement intensity output and brightness output. The storage medium 56 therefore contains a non-linear first mapping of the intensity value to the brightness value, so that each incremental change in the slider position on the virtual/physical keypad or dimmer will correspond to a mapped brightness value in accordance with a series of points along the non-linear curve shown in FIG. 12. The map or plot of intensity versus brightness non-linear curve is generally known as the brightness dimcurve, and is mapped as a first mapping within the storage medium. Movements of the trigger slider via user causes a resulting brightness output, and the gradual movement and recording of brightness output is then used to formulate the first mapping that is then stored in the storage medium 56 for subsequent use.

Figure 13A:
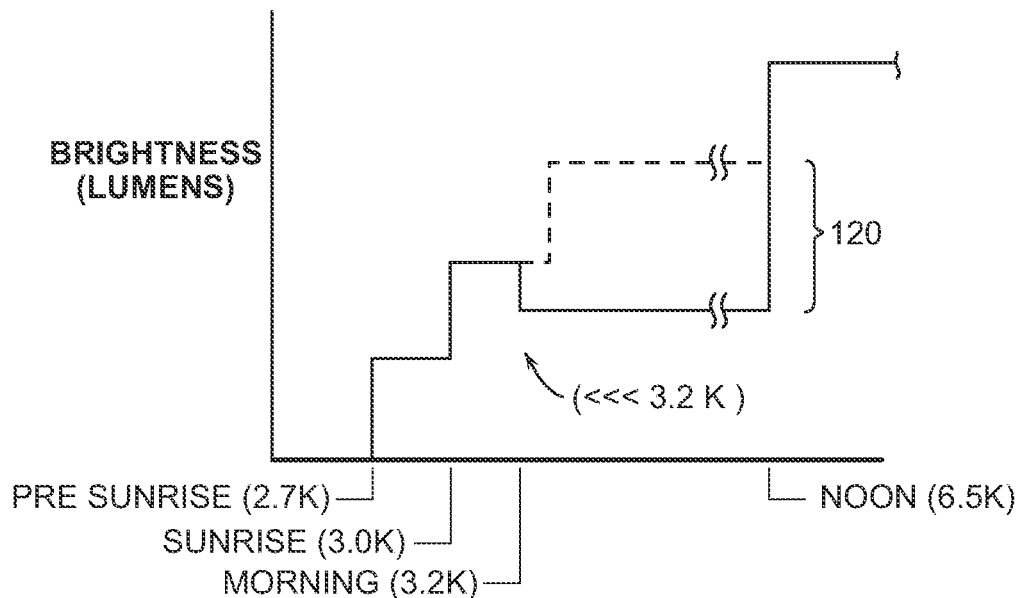
FIGS. 13a and 13b are graphs of different color temperatures appearing at different times of the day, and the differing effect of brightness changes on those color depending on when the brightness is changed.
Figure 13B:
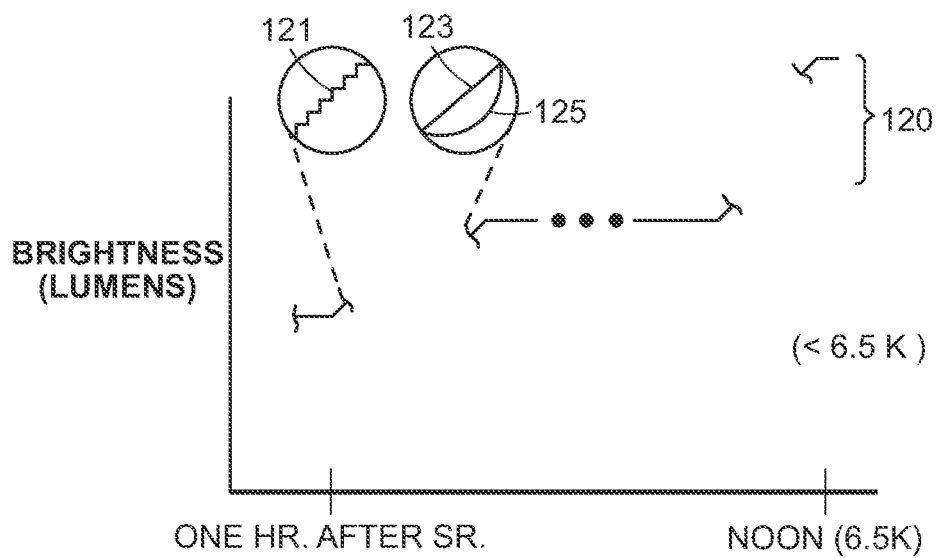

FIGS. 13a and 13b illustrate what occurs when a user actuates the trigger at different times of day, those times of day being ones which are sent from a timer within, for example, a remote controller physical/virtual keypad. A first time of day can be pre-sunrise, followed by a second time of day that triggers a sunrise event. The pre-sunrise, sunrise, morning, and noon times of day each address a different dataset or content stored within the corresponding group or groups of illumination devices. For example, a pre-sunrise time of day output from a timer triggers a first content or dataset of the automatic show, and which sends the appropriate ratio of currents to the LED chains to produce a relatively low color temperature. Thus, the timer triggers a first content, which includes a relatively low lumen output and color temperature. Prior to the automatic change occurring in the show to a higher color temperature at, for example, a morning time of day that would normally produce 3200 Kelvin, a manual adjustment on a trigger of, for example, a dimmer or the physical keypad will reduce the brightness an amount 120 and, importantly, for that reduction in brightness 120, the color temperature that would normally go to 3200 Kelvin would be reduced to much less than 3200 Kelvin. The reduction in brightness 120 and the significant reduction in color temperature can remain for a time out period, until the next time of day signal is sent, or the one following the next time of day signal, or when the trigger is actuated again to release the manual override mode.

The significant reduction in color temperature during manual override dimming when a trigger is actuated (or increase in color temperature during reverse dimming) can occur without any fading. However, it is desirable to fade in the automatic changes in color temperature that occur during the show and prior to manual override. Moreover, it is desirable to have fewer times of day signals sent from the timer to minimize the amount of automatic fading in of color temperature changes. As shown in FIG. 13b, for example, an hour after sunrise a first time of day signal is sent to increase color temperature in a plurality of steps 121, linearly 123, or exponentially 125 over a fixed time that is preferably less than two hours and more preferably less than one hour. To minimize the number of times of day signals, there can be one more time of day signal that decreases color temperature in a plurality of steps, linearly or exponentially over one hour or two hours an hour before sunset. Having possibly only two times of day signals and sending those signals twice a day would significantly reduce the amount of communication needed to perform the show, and would lessen the amount of content needed to be stored in one or more groups of illumination devices.

FIG. 13b also illustrates the same reduction in brightness 120 as that shown in FIG. 13a if, for example, a user actuates the slider on the physical keypad or dimmer the same amount as he or she did an hour after sunrise (i.e., morning) in FIG. 13a. However, in FIG. 13b, the same reduction in brightness 120 produces significantly less reduction in color temperature if the slider is actuated at noon time of day then at sunrise as shown in FIG. 13a. At noon, the color temperature that is automatically and dynamically set at noon time of day to be, for example, 6500 Kelvin, is reduced to slightly less than 6500 Kelvin (<6.5K Kelvin), and that reduction is far less than the reduction that would occur in color temperatures during the morning or sunrise hours (<<<3.2K Kelvin). Accordingly, the effect of changes to brightness on the color temperature depends on the time of day since, shown above, the spectral sensitivity is more profound at LED chains producing a lower color temperature than on LED chains producing a higher color temperature. Even though the power or current supplied to all of the LED chains changes the same amount based on changes to the intensity value, the color temperatures, for example, cool white having a predominance of blue spectral output during noon time will change less than the spectral output of red predominantly produced during the sunrise or pre-sunrise hours.

A circadian show can be used to emulate sunlight at various times of the day and can continue in different groups of illumination devices within a structure. Yet if a defined task is needed for a certain group of illumination devices, or the emulation needs to be changed to more closely resemble the outdoor daylight conditions, the circadian show can be manually modified by a user to have a greater profound effect on color temperatures at certain times of day than other times of day. A significant benefit of the present invention is the greater effect of changes in brightness upon color temperatures one hour after sunrise and an hour before sunset than anytime therebetween, for example.

It is desirable to, even though dimming occurs manually, have a lessened effect on the color emulation at higher color temperature times than at lower color temperature times so that the circadian rhythm is not significantly disrupted even though a user manually changes the circadian show that automatically occurs throughout the daylight hours. In others words, it is more advantageous to change the circadian show to a warmer color temperature during the warm white illumination output times than during the cool white illumination output times that normally occur during peak sunlight hours. In this fashion, the manual adjustment needed to perform a task or to more closely resemble the actual outdoor daylight condition remains more consistent with the actual outdoor daylight condition. Warm white remains more so as warm white, whereas cool white remains cool white, etc.

Reverse dimmer can also occur manually. During the nighttime hours, a user may actuate a trigger to manually override a nighttime automatically changing color temperature show that can be programmed to have no illumination output regardless of the time of day signal sent or, in this case, time of nighttime day signal sent. For example, a user may wish to actuate a trigger button or up/down button on the physical keypad of the bedroom to override the no illumination output show to increase brightness and the color temperature within the group of illumination devices within the bedroom. Reverse dimming advantageously causes a lower color temperature to be output to emulate incandescent lighting output that would normally occur when a user awakes from bed and turns on an incandescent light during nighttime hours. The manual override of reverse dimming that occurs during nighttime is similar to daytime in that a change in brightness will have a greater effect at lower color temperatures than at higher color temperatures. The present invention therefore applies to a circadian show that extends beyond daytime, and the manual override equally applies to any change in brightness and its effect on lower color temperatures more so than higher color temperatures.

Figure 14:
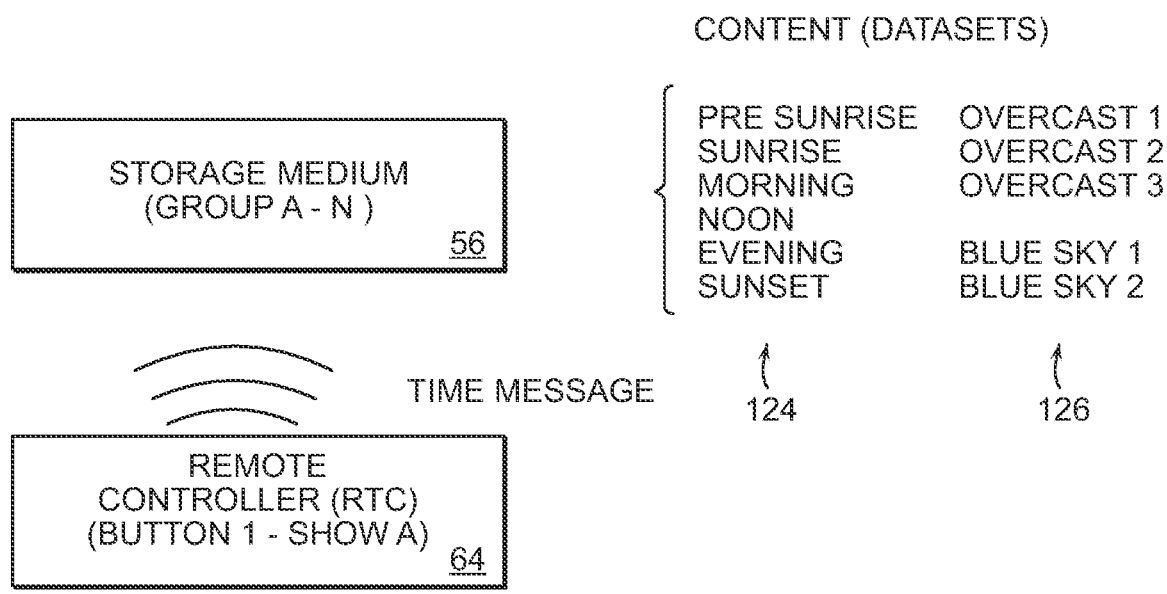
FIG. 14 is a block diagram of content (or datasets) stored in the storage medium of the illumination device and the time message sent from controller to address a different dataset depending on the status of the real time clock within the controller, and to automatically change the color output from the illumination device depending on the status or manually change the color output from the illumination device if a different dataset is addressed.

Turning now to FIG. 14, storage medium 56 can contain content or datasets associated with the illumination device containing the storage medium 56. A group of illumination devices, possibly grouped according to the description shown in FIGS. 9 and 10, can each contain for the corresponding group of illumination devices the same content. For example, the content in the color temperature settings for various times of day 124, or various conditions that a sensor can sense, 126. The various times of day 124 or sunlight conditions 126 stored in each of a group of illumination devices having storage medium 56 are triggered by a time message in a case of time of day 124 or sensor readings in the case of sunlight conditions 126.

As shown in FIG. 14, a time message can activate, or execute upon, content stored in storage medium 56 depending upon the value of that time message, for example, is to execute upon noon time of day dataset 124, then the time message would most likely be at or near noon time local to that timer within the remote controller. The timer or real time clock with a remote controller 64 can send the appropriate time message to address the appropriate content time of day 124. The time message would change the color output of the corresponding group of illumination devices having similarly stored time content or datasets. Alternatively, a button that would invoke a specific show, such as button 1 invoking show A, would cause initiation of show A when button 1 is pushed. This would cause the appropriate time message to be sent or, alternatively, timers can be found within each of the illumination devices that automatically change the content fetched at regular periodic intervals simply by initiating the show A, for example. Whether the time message is sent from the remote controller timer or the timer exists within the group of illumination devices based on the programmed show, a periodically changing, automatically changing sequence of content or datasets are executed upon by the control circuit controller 54 to emulate the changes in sunlight along the daytime locus from as little as 2000 Kelvin during early sunrise to a maximum of over 6000 Kelvin at noon time and then dropping back to less than 2000 Kelvin at sunset, for example. According to an alternative embodiment, a sensor can be employed similar to temperature sensor 58 to measure the sunlight, either interior to or exterior from the structure, and then based on the sensor readings automatically and dynamically change the content or dataset extracted and executed upon so that the sensed daylight can be emulated not only along the daytime locus but at any chromaticity point or spectrum.

Figure 15:
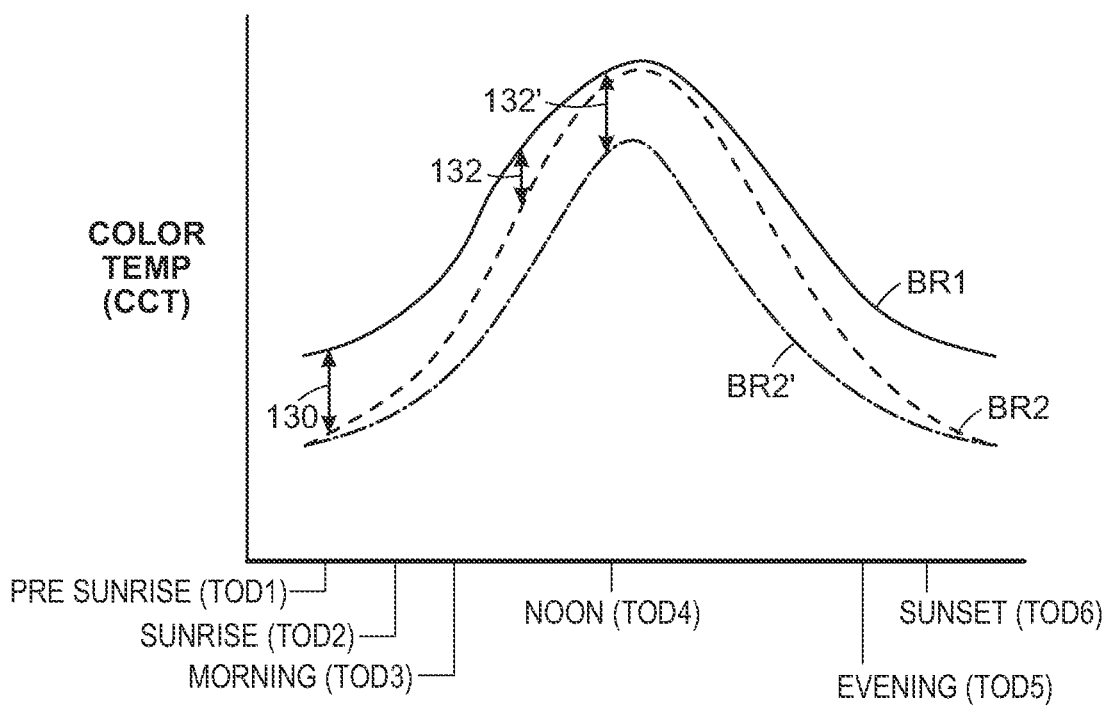
FIG. 15 is graph of color temperature changing as a function of both time of day and brightness.

FIG. 15 is a graph of color and specifically color temperature or CCT, changing as a function of both time of day and brightness. The color temperature for reasons described above automatically and dynamically changes throughout the day. As shown, the color temperature output from the plurality of LED chains automatically changes to replicate the actual sunlight conditions outside the structure and, for example, emulate the natural sunlight needed for treatment of circadian rhythm disorders. During non-peak sunlight hours, such as pre-sunrise, sunrise in morning hours, as well as evening and sunset hours, the color temperature can emulate sunrise and sunset hours along the daytime locus. Preferably, during the morning and evening hours, the target color temperatures are less than, for example, 3200 or 3000 Kelvin, and around the noon-time hour the target color temperature can be as high as 6000 or 6500 Kelvin. The 6000-6500 Kelvin can emulate blue sky noon time, whereas 3500 or less than 3000 Kelvin can emulate a mixture of predominantly yellow with some red morning sky or evening sky. FIG. 15 illustrates different times of day (TOD), beginning with TOD1 through TOD6, and possibly more.

FIG. 15 also shows a change in brightness from, for example, full brightness BR1 to a brightness less than full brightness, or BR2. According to one embodiment the brightness changes from one level BR1 that is constant throughout the day to another level BR2 that is also constant throughout the day. According to another embodiment, the brightness changes from one level BR1 that varies throughout the day to another level BR2 that also varies throughout the day. In either embodiment, the brightness changes from BR1 to BR2, causing an effect on color temperature is shown to depend on the time of day, with relatively little effect at TOD4, but greater effect at TOD1-3 and TOD5 and TOD6. The difference in color temperature for the same change in brightness is shown by the different arrows 130 and 132. Arrow 130 indicates a greater change in color temperature than arrow 132, yet the change in brightness from BR1 to BR2 is the same. The change in brightness is effectuated by a change in intensity from the remote controller or dimmer. As the trigger on the remote controller or dimmer is reduced to, for example, half its adjustment amount, the intensity can be reduced by half and, according to the first mapping of brightness to intensity shown in FIG. 12, the brightness can be reduced non-linearly by an amount near half the previous brightness. If BR2 represents half brightness relative to BR1, color temperature changes not only as a function of brightness, but also as a function of the time of day. At noon time, for example, even though the slider has moved indicating, for example, half brightness, the color temperature is relatively unaffected. This effect is of value since at noon time when a user wishes to perform a task and reduce the brightness by manually adjusting the slider, it is desirable to place the emulated sunlight at natural sunlight conditions of 6000 Kelvin or higher even though the slider is moved. This ensures the emulated daytime sunlight conditions after manual override still looks normal as to what is occurring outside. In other words, daytime natural sunlight conditions emulated by the plurality of LEDs remains near peak sunlight hours even though a user adjusts the brightness dimming along the dimcurve. Conversely, if a user adjusts the dimming along the dimcurve during sunrise or morning hours, the color temperature will drop more so than at noon for the advantageous reason that the actual sunlight conditions during those hours is more so in the warm white color temperature anyway and any changes to dimming will retain even more so the warm white conditions occurring outside.

FIG. 15 also shows in dashed line, according to a second embodiment, brightness changes from one level BR1 that varies throughout the day to another level BR2' that also varies throughout the day. In this embodiment, any actuation of the trigger slider to invoke manual override will have the same effect in color temperature change throughout the day, as shown by arrow 130 and arrow 132' indicating equal amounts of change at different times of day.

A major advantage of the preferred embodiment hereof is that when tasks are to be performed, for example, and brightness reduction occurs through a dimcurve manually adjusted by a user, the emulated natural sunlight condition nonetheless remains. Continuing the emulated sunlight conditions throughout waking hours and beyond, even when manual dimming or reverse-dimming occurs is beneficial for psychological and aesthetic reasons so that, for example, shortly after sunrise and before sunset, the lighting may be more desirable to be emulating incandescent lighting, such as halogen, etc. that produces more of a warm white color temperature. The color emulation is therefore best suited for implementation as an astronomical show because natural lighting most dramatically changes based on whether the sun is up or down, and specifically the path length of the sun. However, when performing certain tasks, it is necessary to not couple brightness to a time-based show, and therefore a preferred embodiment allows the user to adjust brightness as necessary. Changing brightness at noon time, for example, changes the brightness of the emulated sun at its peak sunlight condition yet retains that peak sunlight or high color temperature condition. Conversely, changing brightness at morning or evening times of day changes brightness of the emulated incandescent lighting, where it is more desirable to produce even further lowering of color temperature than at noon time. Therefore, the preferred embodiments hereof are not necessarily drawn to the automatic and dynamic changes in color temperature throughout the day, but instead are drawn to the task lighting conditions needed by a user periodically throughout the day, where brightness can be changed yet the effect on the color temperature depends upon the time of day at which the dimmer is actuated by the user.

Figure 16:
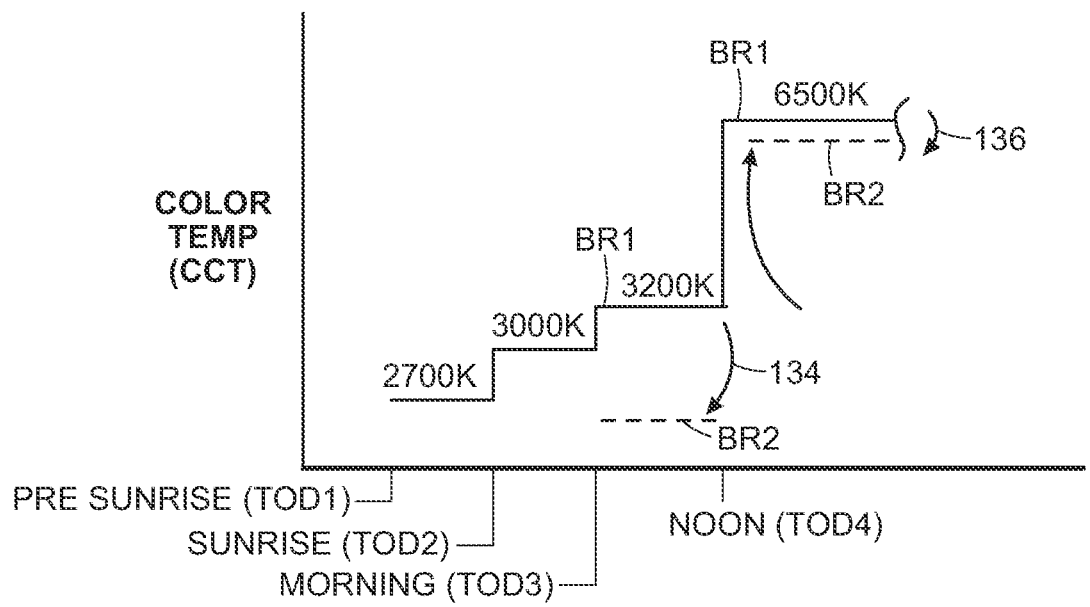
FIG. 16 is another graph of color temperature changing as a function of both time of day and brightness.

FIG. 16 illustrates the effect on color temperature, or CCT, when brightness is manually adjusted at different times in the morning and noon hours (TOD3 and TOD4). Specifically FIG. 16 indicates a greater change in color temperature when brightness is manually changed from BR1 (shown in solid line) to BR2 (shown in dashed line) during the morning hour of TOD3 versus the noon hour of TOD4. At TOD3, when brightness changes from BR1 to BR2 shown by arrow 134, the color temperature substantially drops. Yet, as shown by arrow 136 when brightness changes from BR1 to BR2, the color temperature does not drop nearly as much at noon time TOD4 as morning TOD3. Of course, FIG. 16 is an example of various TODs, and is not representative of possibly using only two TODs: an hour after sunrise and an hour before sunset, and possibly sunset or nighttime. Moreover, FIG. 16 does not illustrate TODs after sunset, or the reverse dimming that can occur either during the daytime or after nighttime. Still further, FIG. 16 does not illustrate the fading in of automatic changes to color temperatures that would occur at each TOD.

Figure 17:
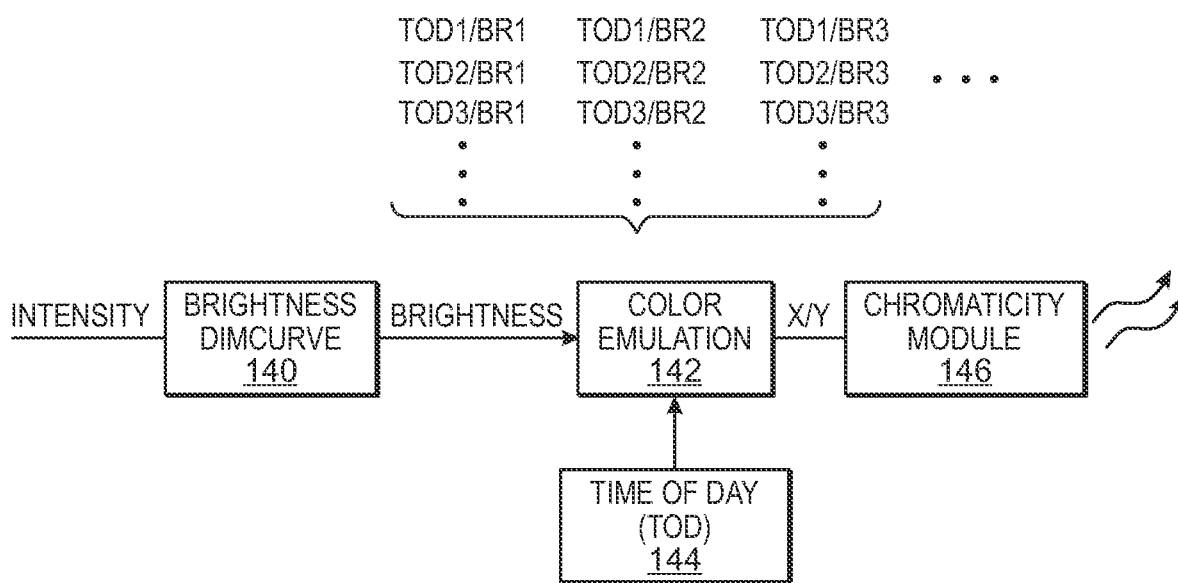
FIG. 17 is a block diagram of intensity forwarded to a brightness dim curve and brightness forwarded to a color emulation curve to generate a target color temperature whenever the daytime emulation show, for example, is manually changed.

FIG. 17 illustrates how user input from manual activation triggers, such as a slider, on a triac dimmer or associated with a physical or virtual keypad, produces intensity values fed into a brightness dimcurve module 140 contains non-linear first mapping of the intensity value to the brightness value within the storage medium, and maps a brightness value corresponding to the intensity value input to the dimcurve module 140. A color emulation module 142 receives the brightness value, as well as time of day messages, or TOD values from, for example, a timer 144. The combination of TOD values and brightness (BR) values are received by a second mapping of color temperatures as a function of the time of day, as well as the brightness input. The color emulation module 142 therefore performs the second mapping of the color temperature as a function of the time of day as well as the brightness level input thereto. Color emulation module 142 produces the corresponding color temperature along the X/Y chromaticity graph and specifically along the black body curve of color temperatures. Knowing the appropriate chromaticity, the chromaticity module 146 can comprise the control circuit and the LED driver circuits for controlling each of the LED chains by sending the appropriate drive current to each of the plurality of LED chains. Chromaticity module 146 therefore comprises the control and driving of the plurality of LED chains to produce the appropriate illumination from each of the plurality of LED chains. The combination of the first and second mappings through the brightness dimcurve module 140 and the color emulation module 142 produce the appropriate drive currents within the chromaticity module for maintaining sunlight emulation that is dependent upon the time of day as well as the brightness changes.

It will be appreciated to those skilled in the art having the benefit of this disclosure that this invention is believed to provide an improved illumination device, system and method that not only emulates sunlight throughout the day, but as lighting tasks are needed, that emulation can be maintained by advantageously dropping color temperature in the morning and evening hours more so than during noon time, for example. Further modifications in alternative embodiments of various aspects of the invention will be apparent to those skilled in the art in view of this description. It is intended, therefore, that the following claims be interpreted to embrace all such modifications and changes and, accordingly, the specification and drawings are to be regarded in an illustrative rather than a restricted sense.

What is claimed is:

1. An illumination device, comprising:
a plurality of light emitting diodes (LEDs);
one or more driver circuits coupled to the plurality of LEDs; and
a control module coupled to the one or more driver circuits, said control module comprising:
an interface coupled to receive an intensity;
a storage medium comprising a non-linear first mapping of intensity to brightness, and a second mapping of color temperature as a function of time of day and brightness; and
a controller configured to:
cause the one or more driver circuits to autonomously adjust the brightness and the color temperature of the plurality of LEDs as a function of time of day;
responsive to receipt, from a remote controller device disposed remote from the illumination device, of a requested change in intensity value provided by the illumination device from a first intensity value that corresponds to a current brightness and a current color temperature based on a current time of day to a second intensity value;
determine a target brightness using the first mapping, the target brightness based on the received second intensity value;
determine a target color temperature of the plurality of LEDs using the second mapping, the target color temperature based on the current time of day and the determined target brightness; and
cause the one or more driver circuits to adjust the brightness and the color temperature of each of at least some of plurality of LEDs to produce an illumination at the target color temperature and the determined target brightness;
wherein to transition the plurality of LEDs to the second intensity at different times of day causes a corresponding change in the determined target color temperature.

2. The illumination device of claim 1, wherein the one or more driver circuits are configured to transition to the target color temperature by adjusting respective drive currents of the at least some of the plurality of LEDs.

3. The illumination device of claim 1, wherein the intensity is applied by user actuation of a button or slider on the remote controller device.

4. The illumination device of claim 1, wherein the remote controller device comprises a keypad or a mobile device.

5. The illumination device of claim 1, wherein the interface is further configured to receive control commands from the remote controller device.

6. The illumination device of claim 5, wherein the control commands comprise one of an intensity, a color temperature, or a scene.

7. The illumination device of claim 1, wherein the plurality of LEDs comprises a plurality of LED chains.

8. The illumination device of claim 1, wherein when a first time of day is near either sunrise or sunset, the plurality of LEDs transition to the second intensity at a first determined target color temperature, and when a second time of day is near noontime, the plurality of LEDs transition to the second intensity at a second determined target color temperature different than the first determined target color temperature.

9. A method comprising:
causing one or more driver circuits to autonomously adjust a brightness and a color temperature of a plurality of light-emitting diodes (LEDs) disposed in an illumination device as a function of time of day;
receiving, from a remote controller device disposed remote from the illumination device, a requested change in an intensity value provided by the illumination device from a first intensity value that corresponds to a current brightness and a current color temperature based on a current time of day to a second intensity;

determining a target brightness of the plurality of LEDs using a non-linear first mapping of intensity to brightness, the target brightness based on the received second intensity value;

determining a target color temperature of the plurality of LEDs using a second mapping of color temperature as a function of time of day and brightness, the target color temperature based on the time of day and the determined target brightness; and causing, by the controller, the one or more driver circuits to adjust the brightness and the color temperature of each of at least some of the plurality of LEDs to produce an illumination at the target color temperature and the determined target brightness.

10. The method of claim 9, wherein to transition the plurality of LEDs to the second intensity at different times of day causes corresponding change in the determined target color temperature.

* * * * *